(12) United States Patent
Hsu

(10) Patent No.: US 9,475,719 B2
(45) Date of Patent: Oct. 25, 2016

(54) POOL WATER PURIFYING DEVICE

(71) Applicant: Tsai-Chun Hsu, Taoyuan County (TW)

(72) Inventor: Tsai-Chun Hsu, Taoyuan County (TW)

( * ) Notice: Subject to any disclaimer, the term of this patent is extended or adjusted under 35 U.S.C. 154(b) by 158 days.

(21) Appl. No.: 14/312,769

(22) Filed: Jun. 24, 2014

(65) Prior Publication Data

US 2015/0368134 A1 Dec. 24, 2015

(51) Int. Cl.

| | |
|---|---|
| *E04H 4/12* | (2006.01) |
| *C02F 1/32* | (2006.01) |
| *C02F 1/461* | (2006.01) |
| *C02F 9/00* | (2006.01) |
| *B01D 24/00* | (2006.01) |
| *B01D 24/10* | (2006.01) |
| *C02F 1/00* | (2006.01) |
| *C02F 1/46* | (2006.01) |
| *C02F 103/22* | (2006.01) |
| *C02F 103/42* | (2006.01) |
| *C02F 1/28* | (2006.01) |
| *C02F 103/20* | (2006.01) |

(52) U.S. Cl.
CPC ............... *C02F 9/00* (2013.01); *B01D 24/002* (2013.01); *B01D 24/10* (2013.01); *C02F 1/004* (2013.01); *C02F 1/281* (2013.01); *C02F 1/283* (2013.01); *C02F 1/32* (2013.01); *C02F 1/4606* (2013.01); *C02F 2103/20* (2013.01); *C02F 2103/22* (2013.01); *C02F 2103/42* (2013.01); *C02F 2201/005* (2013.01); *C02F 2201/322* (2013.01); *C02F 2201/3223* (2013.01); *C02F 2201/4614* (2013.01); *C02F 2201/4617* (2013.01); *E04H 4/1209* (2013.01)

(58) Field of Classification Search
CPC ........ C02F 9/00; C02F 1/004; C02F 1/4606; C02F 1/32; C02F 2103/22; C02F 2103/42; C02F 2201/005; C02F 2201/322; C02F 2201/4617; E04H 4/1209; B01D 24/002; B01D 24/10

USPC ............. 210/167.11, 748.1, 748.11, 748.12, 210/748.17, 748.18, 748.19, 252, 259, 903, 210/175, 748.2

See application file for complete search history.

(56) References Cited

U.S. PATENT DOCUMENTS

| | | | |
|---|---|---|---|
| 2004/0099608 A1* | 5/2004 | Leffler | C02F 1/4672 210/704 |
| 2004/0159615 A1* | 8/2004 | Leffler | C01D 3/06 210/748.11 |
| 2009/0127207 A1* | 5/2009 | Okamoto | B63B 13/00 210/747.6 |
| 2010/0116647 A1* | 5/2010 | Kornmuller | B63J 4/004 204/228.1 |
| 2011/0180423 A1 | 7/2011 | Barry et al. | |

FOREIGN PATENT DOCUMENTS

| | | |
|---|---|---|
| CN | 101484389 A | 7/2009 |
| CN | 103384645 A | 11/2013 |

\* cited by examiner

*Primary Examiner* — Fred Prince
(74) *Attorney, Agent, or Firm* — Alan D. Kamrath; Kamrath IP Lawfirm, P.A.

(57) ABSTRACT

A pool water purifying device includes a rough filtration module having a first housing. A rough filter is received in the first housing. An electrolyzing module includes a second housing. Two electrodes and an ultraviolet lamp are mounted to the second housing and extend into the second housing. The electrodes are electrically connected to a power supply. A fine filtration module includes a third housing receiving a fine filter. A piping unit includes a plurality of pipes and a plurality of valves. The valves connect the first, second, and third housings to intercommunicate the first, second, and third housings with each other. The valves are mounted on the pipes to control communication between the pipes.

20 Claims, 16 Drawing Sheets

POOL WATER PURIFYING DEVICE

BACKGROUND OF THE INVENTION

1. Field of the Invention

The present invention relates to a pool water purifying device and, more particularly, to a pool water purifying device for purifying water in a cultivation pool or scenic pool.

2. Description of the Related Art

The main pollutants to water in a cultivation pool or scenic pool mainly come from dust, fallen leaves, and nitrogen-containing organic substances, such as feces of aquatic creatures and residuary foods for the aquatic creatures. After decomposition of the nitrogen-containing organic substances by microorganisms, inorganic nitrides (such as ammonia nitrogen and nitrate nitrogen) accumulate in the pool water and cause eutrophication of the pool water, greatly affecting the ecology of the pool. For a cultivation pool, the aquatic animals could even be poisoned if the concentration of ammonia nitrogen is too high, leading to mass deaths of the aquatic animals and reducing the cultivating yield. Thus, ammonia nitrogen in the pool water must be removed.

In current techniques, a water wheel is used to continuously agitate the water level to increase the dissolved oxygen, turning ammonia nitrogen into less toxic nitrate nitrogen through nitrification. However, high-concentration nitrate nitrogen greatly helps propagation of algae, and excessive algae often causes degradation of water or even deaths of aquatic animals. Thus, cultivators have to use chemicals to control the water quality, which increases the yield at the cost of reduced quality of aquatic animals and reduced market prices.

In other techniques, probiotics are cast into the pool water to nitrify and denitrify inorganic nitrides (such as ammonia nitrogen and nitrate nitrogen) by microorganisms such as nitrosomonas, nitrobacteria, and denitrifying bacteria. Although this method is more natural, it has a slow reaction speed resulting in poor efficiency, is apt to be restricted by weather conditions, and is only suitable for treating water having a low concentration of ammonia nitrogen. Furthermore, the purchasing cost of probiotics is high, and additional nutrient salts must be added into the water when the nutrient salts for treating the bacteria in the water are insufficient, leading to a burden to the costs.

Furthermore, in addition to removal of ammonia nitrogen, purification of the pool water also requires filtration of impurities and disinfection to maintain the water quality of the pool water. Furthermore, water temperature modulation is preferably provided when the water temperature is too high or too low. However, the devices for removing inorganic nitrides from pool water, for filtering impurities, for disinfection, and for modulating water temperatures are separate from each other, such that the water purifying procedures must be carried out one by one. Furthermore, the operational sequence of the devices with different functions must be operated and adjusted by human labor rather than automatic, continuous operation. The water purifying efficiency is poor, and the water purifying effect could be adversely affected due to improper operation of the operational sequence. Furthermore, the devices with different functions occupy considerable space for storage, leading to troubles in the space management of the operating environment.

SUMMARY OF THE INVENTION

An objective of the present invention is to provide a pool water purifying device capable of producing hypochlorous acid water with a disinfecting effect or directly turning ammonia nitrogen in the water into gaseous nitrogen to greatly improve the treatment efficiency of inorganic nitrides while providing a disinfecting effect.

Another objective of the present invention is to provide a pool water purifying device that integrates various modules with different functions required for purifying the pool water, allowing continuous water purifying operation to improve the water purifying efficiency while reducing the storage space required for the pool water purifying device.

The present invention fulfills the above objectives by providing a pool water purifying device including a rough filtration module having a first housing. A rough filter is received in the first housing. An electrolyzing module includes a second housing. Two electrodes and an ultraviolet lamp are mounted to the second housing and extend into the second housing. The electrodes are electrically connected to a first power supply. A fine filtration module includes a third housing receiving a fine filter. A piping unit includes a plurality of pipes and a plurality of valves. The plurality of valves connects the first, second, and third housings to intercommunicate the first, second, and third housings with each other. The plurality of valves is mounted on the plurality of pipes to control communication between the plurality of pipes.

The working voltage of the first power supply can be variable.

The ultraviolet lamp can be mounted between the electrodes, and on/off of the ultraviolet lamp is controllable.

A gas exhaust pipe can be mounted to a top of the second housing.

A plurality of ceramics can be received in a bottom portion of the second housing and aligned with one of two liquid ports of the second housing.

The pool water purifying device can further include a water temperature modulating module. The water temperature modulating module includes a fourth housing, a heating element, and a cooling element. The heating element and the cooling element are mounted to the fourth housing and extend into the fourth housing. One of the heating element and the cooling element is selectively activated to heat or cool water in the fourth housing. The piping unit further includes a first pipe and a first valve on the first pipe. The fourth housing intercommunicates with the third housing via the first pipe. The first valve controls communication between the third housing and the fourth housing.

In an embodiment, the third housing includes two liquid ports. One of the plurality of pipes of the piping unit is connected to one of the liquid ports of the third housing. A venturi tube is mounted on the one of the plurality of pipes and has a throat. A ventilation pipe includes an end intercommunicated with the throat of the venturi tube. The other end of the ventilation pipe is open.

The filter can include charcoal, a cartridge made of active carbon, or a plurality of particles.

In an embodiment, the rough filter includes an upper layer and a lower layer connected to the upper layer. The upper layer includes a plurality of silicon carbide particles. The lower layer includes a plurality of zeolite particles. The first housing includes two liquid ports. One of the two liquid ports of the first housing is aligned with the upper layer of the rough filter. The other liquid port of the first housing is aligned with the lower layer of the rough filter.

The pool water purifying device can further include a hypochlorous acid water generating module. The hypochlorous acid water generating module includes a fifth housing and two electrodes. The electrodes of the hypochlorous acid water generating module are mounted to the fifth housing and extend into the fifth housing. The electrodes of the hypochlorous acid water generating module are electrically connected to a second power supply. The piping unit further includes additional pipes and additional valves on the additional pipes. The fifth housing intercommunicates with the first, second, and third housings by the additional pipes. The additional valves control communication between the plurality of pipes and the additional pipes.

In an embodiment, a sodium chloride supply tank is provided in communication with an interior of the fifth housing.

In another embodiment, a sodium chloride supply tank is provided in communication with an interior of the second housing.

Thus, the pool water purifying device according to the present invention is capable of producing hypochlorous acid water with a disinfecting effect or directly turning ammonia nitrogen in the water into gaseous nitrogen to greatly improve the treatment efficiency of inorganic nitrides while providing a disinfecting effect. Furthermore, the pool water purifying device according to the present invention integrates various modules with different functions required for purifying the pool water, allowing a continuous water purifying operation to improve the water purifying efficiency while reducing the storage space required for the pool water purifying device.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

DETAILED DESCRIPTION OF THE INVENTION

Figure 1:
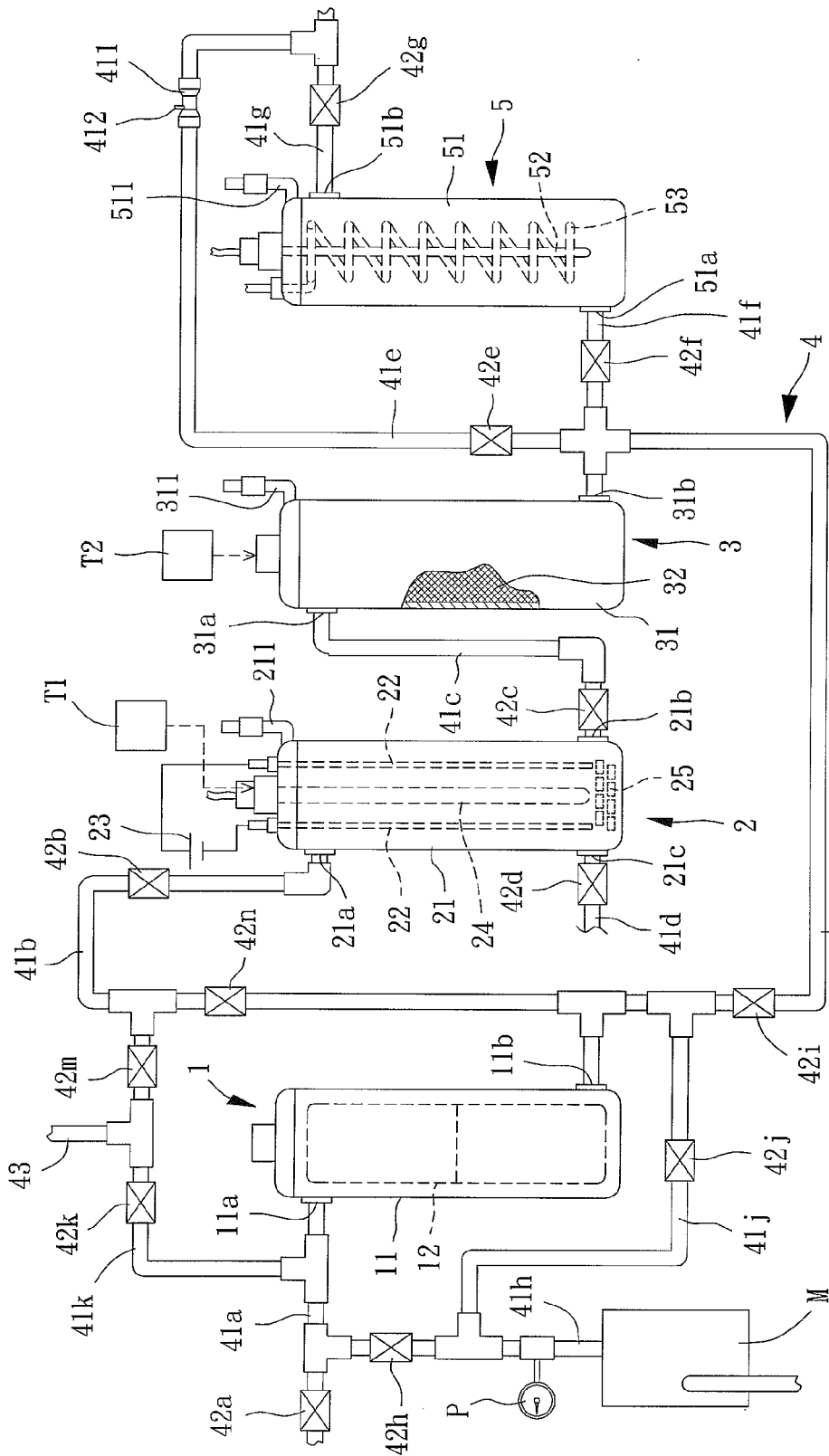
FIG. 1 is a diagrammatic structural plan view of a pool water purifying device of a first embodiment according to the present invention.

With reference to FIG. 1, a pool water purifying device of a first embodiment according to the present invention includes a rough filtration module 1, an electrolyzing module 2, a fine filtration module 3, and a piping unit 4. The piping unit 4 includes a plurality of pipes to connect the rough filtration module 1, the electrolyzing module 2, and the fine filtration module 3. The piping unit 4 further includes a plurality of valves for controlling flow of water.

The rough filtration module 1 includes a first housing 11 having a first liquid port 11*a* and a second liquid port 11*b*. The first liquid port 11*a* is connected to a pipe 41*a*. A valve 42*a* in the form of a one-way pressure relief valve is mounted on the pipe 41*a*. The second liquid pipe 11*b* is connected to a pipe 41*b*. Thus, water can flow into and out of the first housing 11 via the pipes 41*a* and 41*b*. A rough filter 12 is received in the first housing 11 for filtering impurities in water, such as silt, fallen leaves, feces of aquatic creatures, and residuary foods for aquatic creatures. In this embodiment, the rough filter 12 includes an upper layer and a lower layer connected to the upper layer. The upper layer includes a plurality of silicon carbide particles. The lower layer includes a plurality of zeolite particles. The first liquid port 11*a* of the first housing 11 aligns with the upper layer of the rough filter 12. The second liquid port 11*b* of the first housing 11 aligns with the lower layer of the rough filter 12.

The electrolyzing module 2 includes a second housing 21 having a third liquid port 21*a*, a fourth liquid port 21*b*, and a water outlet 21*c*. The third liquid port 21*a* is connected to the pipe 41*b* of the piping unit 4, such that the second housing 21 is in communication with the first housing 11. The fourth liquid port 21*b* is connected to a pipe 41*c* of the piping unit 4. The water outlet 21*c* is connected to a pipe 41*d* of the piping unit 4, such that water can flow into and out of the second housing 21 via the pipes 41*b*, 41*c*, and 41*d*. A valve 42*b* is mounted on the pipe 41*b*, a valve 42*c* is mounted on the pipe 41*c*, and a valve 42*d* is mounted on the pipe 41*d*. Furthermore, a gas exhaust pipe 211 is mounted to a top of the second housing 21. In a case that the pool water to be purified is fresh water, a sodium chloride supply tank T1 can intercommunicate with an interior of the second housing 21 for supplying sodium chloride into water in the second housing 21. On the other hand, if the pool water to be purified is salt water, the sodium chloride supply tank T1 is not required.

The electrolyzing module 2 further includes two electrodes 22, a power supply 23, and an ultraviolet lamp 24. The electrodes 22 are mounted to the second housing 21 and extend into the second housing 21. The power supply 23 is a DC power source. Preferably, the working voltage of the power supply 23 is variable. A positive pole of the power supply 23 is electrically connected to one of the electrodes 22. A negative pole of the power supply 23 is electrically connected to the other electrode 22. Preferably, the ultraviolet lamp 24 is mounted between the electrodes 22. On/off of the ultraviolet lamp 24 can be controlled. Preferably, the electrolyzing module 2 further includes a plurality of ceramics 25 received in a bottom portion of the second housing 21. The fourth liquid port 21b of the second housing 21 is aligned with the ceramics 25.

The fine filtration module 3 includes a third housing 31 having a fifth liquid port 31a and a sixth liquid port 31b. The fifth liquid port 31a is connected to the pipe 41c of the piping unit 4, such that the third housing 31 is in communication with the second housing 21. The valve 42c controls communication between the third housing 31 and the second housing 21. The sixth liquid port 31b is connected to a pipe 41e of the piping unit 4. A valve 42e is mounted on the pipe 41e to control communication between two ends of the pipe 41e. Preferably, a venturi tube 411 is provided on the pipe 41e. The valve 42e is located between the venturi tube 411 and the sixth liquid port 31b of the third housing 31. The venturi tube 411 includes a neck portion having a throat with the minimal diameter. An end of a ventilation pipe 412 is in communication with the throat of the venturi tube 411. The other end of the ventilation pipe 412 is open to intercommunicate with the outside.

A fine filter 32 is received in the third housing 31 for absorbing tiny impurities in the water, such as for filtering free chloride, oxides, odors, and organic solvents. In this embodiment, the fine filter 32 can include charcoal, a cartridge made of active carbon, or a plurality of particles. Furthermore, a gas exhaust pipe 311 is mounted on a top of the third housing 31. Furthermore, a formulation supply tank T2 is in communication with an interior of the third housing 31 to supply formulations (such as probiotics) assisting in improving health of aquatic animals.

The pool water purifying device can further include a water temperature modulating module 5 including a fourth housing 51 having a seventh liquid port 51a and an eighth liquid port 51b. The seventh liquid port 51a is connected to a pipe 41f of the piping unit 4. A valve 42f is mounted on the pipe 41f The pipe 41f is connected to the pipe 41e and is located between the valve 42e and an end of the pipe 41e connected to the sixth liquid port 31b. Thus, the fourth housing 51 intercommunicates with the third housing 31, and the valve 42f controls communication between the fourth housing 51 and the third housing 31. The eighth liquid port 51b is connected to a pipe 41g of the piping unit 4, such that water can flow into and out of the fourth housing 51 via the pipes 41f and 41g. The other end of the pipe 41e intercommunicates with the pipe 41g. A valve 42g is mounted on the pipe 41g to control communication between the pipe 41e and the eighth liquid port 51b. A gas exhaust pipe 511 is mounted to a top of the fourth housing 51.

The water temperature modulating module 5 further includes a heating element 52 and a cooling element 53. The heating element 52 and the cooling element 53 are mounted to the fourth housing 51 and extend into the fourth housing 51. The heating element 52 and the cooling element 53 can be activated under control. One of the heating element 52 and the cooling element 53 is selectively activated at a time to heat or cool the water in the fourth housing 51.

In addition to the above structure, the piping unit 4 further includes a pipe 41h, a valve 42h mounted on the pipe 41h, a pipe 41i, a valve 42i mounted on the pipe 41i, a pipe 41j, a valve 42j mounted on the pipe 41j, a pipe 41k, two valves 42k and 42m mounted on the pipe 41k, and a valve 42n. An end of the pipe 41h is connected to the pipe 41a. The other end of the pipe 41h is connected to a water pump M for pumping water into the pipe 41h. A hydraulic gauge P is mounted on the pipe 41h and is located adjacent to the water pump M for measuring water pressure in the pipe 41h. An end of the pipe 41i intercommunicates with the pipe 41b. The other end of the pipe 41i intercommunicates with the pipes 41e and 41f. An end of the pipe 41j intercommunicates with the pipe 41h and is located between the water pump M and the valve 42h. The other end of the pipe 41j intercommunicates with the pipes 41b and 41i. An end of the pipe 41k intercommunicates with the pipe 41a. The other end of the pipe 41k intercommunicates with the pipe 41b. A sewage pipe 43 is mounted between two ends of the pipe 41k and is located between the valves 42k and 42m. The valve 42n is mounted on the pipe 41b and is located between the valve 42b and the third liquid port 21a of the second housing 21. An end of the pipe 41k connected to the pipe 41b is located between the valve 42b and the valve 42n.

Figure 2:
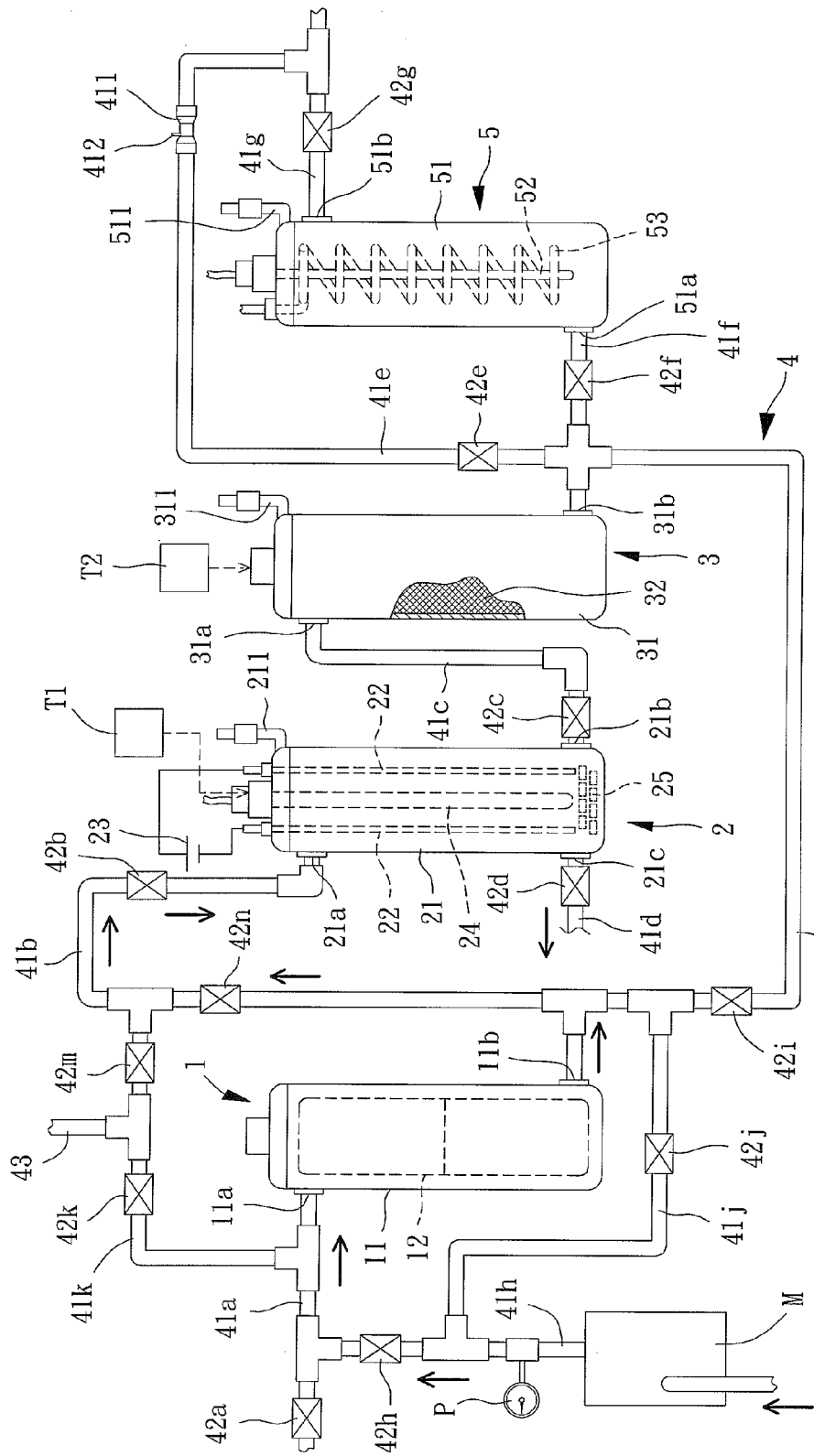
FIG. 2 is a diagrammatic view illustrating generation of hypochlorous acid water by the pool water purifying device of the first embodiment according to the present invention.

With reference to FIG. 2, in use of the pool water purifying device of the first embodiment according to the present invention, the valves 42b, 42d, 42h, and 42n of the piping unit 4 are opened, the valves 42c, 42i, 42j, 42k, and 42m are closed, the valves 42e, 42f, and 42g maintain their states (open or closed), and the ultraviolet lamp 24 is turned off. The pool water is pumped by the water pump M into the pipe 41h and flows into the pipe 41a after passing through the valve 42h. Then, the water flows through the first liquid port 11a into the first housing 11 of the rough filtration module 1. Then, the water flows out of the first housing 11 via the second liquid port 11b and flows into the pipe 41b. Next, the water flows into the second housing 21 after passing through the valves 42n and 42b and the third liquid port 21a. In a case that the pool water is fresh water, sodium chloride is supplied from the sodium chloride supply, tank T1 into the water in the second housing 21 (sodium chloride is not supplied if the pool water is salt water). The power supply 23 supplies electricity to the electrodes 22 to electrolyze the sodium chloride-containing water in the second housing 21.

The water dissolving sodium chloride is electrolyzed by the electrodes 22. Gaseous hydrogen is generated at one of the electrodes 22 after electrolysis (the chemical equation is: $2Na^+ + 2H_2O + 2e^- \rightarrow 2NaOH + H_2\uparrow$). Gaseous hydrogen is discharged via the gas exhaust pipe 211. Gaseous chlorine is generated at the other electrode 22 after electrolysis (the chemical equation is: $2Cl^- \rightarrow Cl_2 + 2e^-$). Gaseous chlorine combines with water to form hypochlorous acid water (the chemical equation is: $Cl_2 + H_2O \rightarrow H^+ + Cl^- + HClO$). Hypochlorous acid (HCLO) water with a disinfectant effect is, thus, produced and discharged back into the pool via the pipe 41d to disinfect the pool water.

Figure 3:
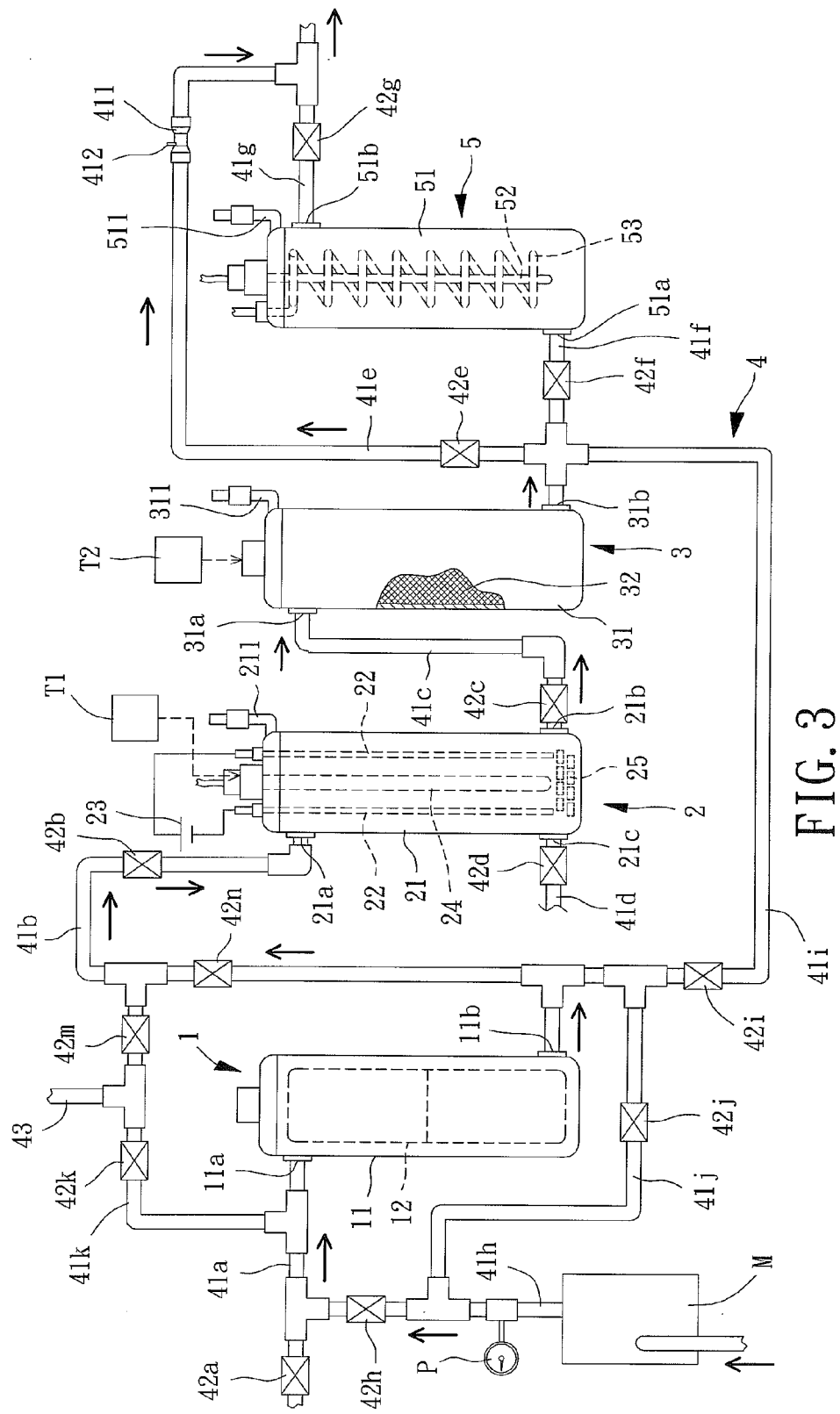
FIG. 3 is a diagrammatic view illustrating removal of ammonia nitrogen and increase of dissolved oxygen by the pool water purifying device of the first embodiment according to the present invention.

If it is not desired to inject hypochlorous acid water into the pool water, with reference to FIG. 3, the valves 42b, 42c, 42h, 42e, and 42n of the piping unit 4 are opened, the valves 42d, 42f, 42g, 42i, 42j, 42k and 42m are closed, and the ultraviolet lamp 24 is turned on. Similar to the above procedure, the pool water flows into the second housing 21 after passing through the rough filtration module 1, and the water dissolving sodium chloride is electrolyzed by the electrodes 22. In this case, the hypochlorous acid water is radiated by the ultraviolet lamp 24 and decomposes to hydrogen free radicals and chloride free radicals. Chloride free radicals turn ammonia nitrogen into gaseous nitrogen ($N_2$) which is discharged via the gas exhaust pipe 211, achieving the effect of removing ammonia nitrogen from water. Thus, the present invention can directly turn ammonia nitrogen in the water dissolving sodium chloride into gaseous nitrogen without the need of turning into nitrite nitrogen and nitrate nitrogen, greatly improving the treatment efficiency of inorganic nitrides in water.

After removal of ammonia nitrogen from the water, the water flows out of the second housing 21 via the fourth liquid port 21b and flows into the pipe 41c. Then, the water flows into the third housing 31 of the fine filtration module 3 after passing through the valve 42c and the fifth liquid port 31a. In a case that the second housing 21 receives the ceramics 25, the water can flow through the ceramics 25 to remove bacteria, organic compounds, suspended particles, and precipitates before flowing out of the second housing 21. After the water flows into the third housing 31, tiny impurities in the water can be absorbed by the fine filter 32 to further improve the clarity of the water.

Then, the water flows out of the third housing 31 via the sixth liquid port 31b and flows into the pipe 41e. After passing through the valve 42e and the venturi tube 411, the water flows into the pipe 41g and is then discharged back into the pool. Since the static pressure of the water drops while passing through the throat of the venturi tube 411, the ambient air enters the venturi tube 411 via the ventilation pipe 412 to increase the dissolved oxygen in the water.

Figure 4:
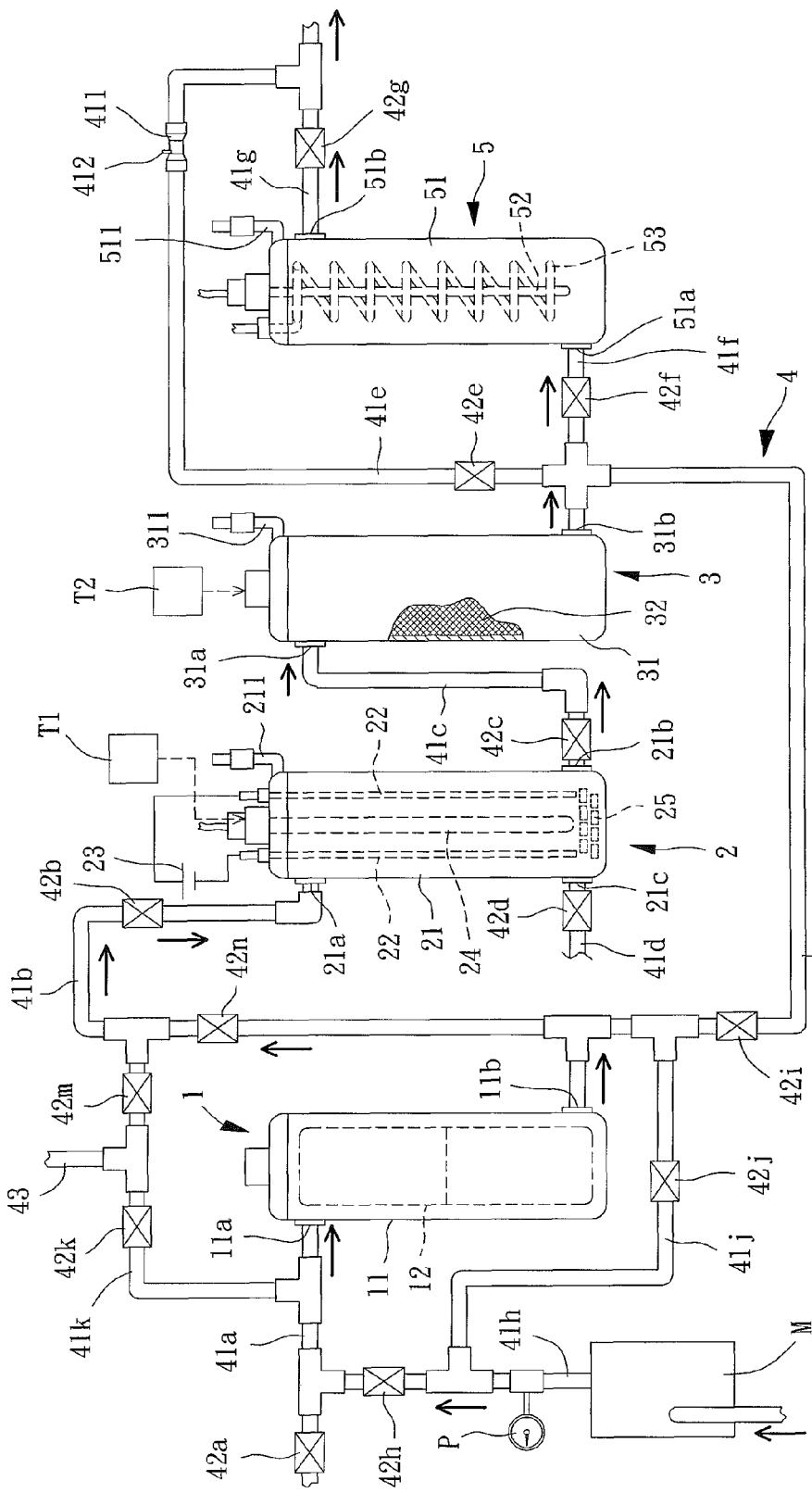
FIG. 4 is a diagrammatic view illustrating removal of ammonia nitrogen and modulation of water temperature by the pool water purifying device of the first embodiment according to the present invention.

With reference to FIG. 4, in an extreme weather event (such as a cold wave), the valves 42b, 42c, 42h, 42f, 42g and 42n of the piping unit 4 are opened, the valves 42d, 42e, 42i, 42j, 42k, and 42m are closed, and the heating element 52 of the water temperature modulating module 5 is activated. After the pool water has flowed in sequence through the rough filtration module 1, the electrolyzing module 2, and the fine filtration module 3 filtering the water, the water flows in sequence through the pipes 41e and 41f and passes the valve 42f and the seventh liquid port 51a and then flows into the fourth housing 51 of the water temperature modulating module 5. The filtered water is heated by the heating element 52 to increase the temperature, then flows out of the fourth housing 51 via the eighth liquid port 51b, and flows back into the pool via the pipe 41g, achieving a water temperature modulating effect for the pool water. Similarly, in hot weather, the cooling element 53 of the water temperature modulating module 5 can be activated to reduce the water temperature before it is discharged back into the pool. Thus, adverse effect on the yield of the aquatic cultivation due to extreme weather events can be reduced.

Figure 5:
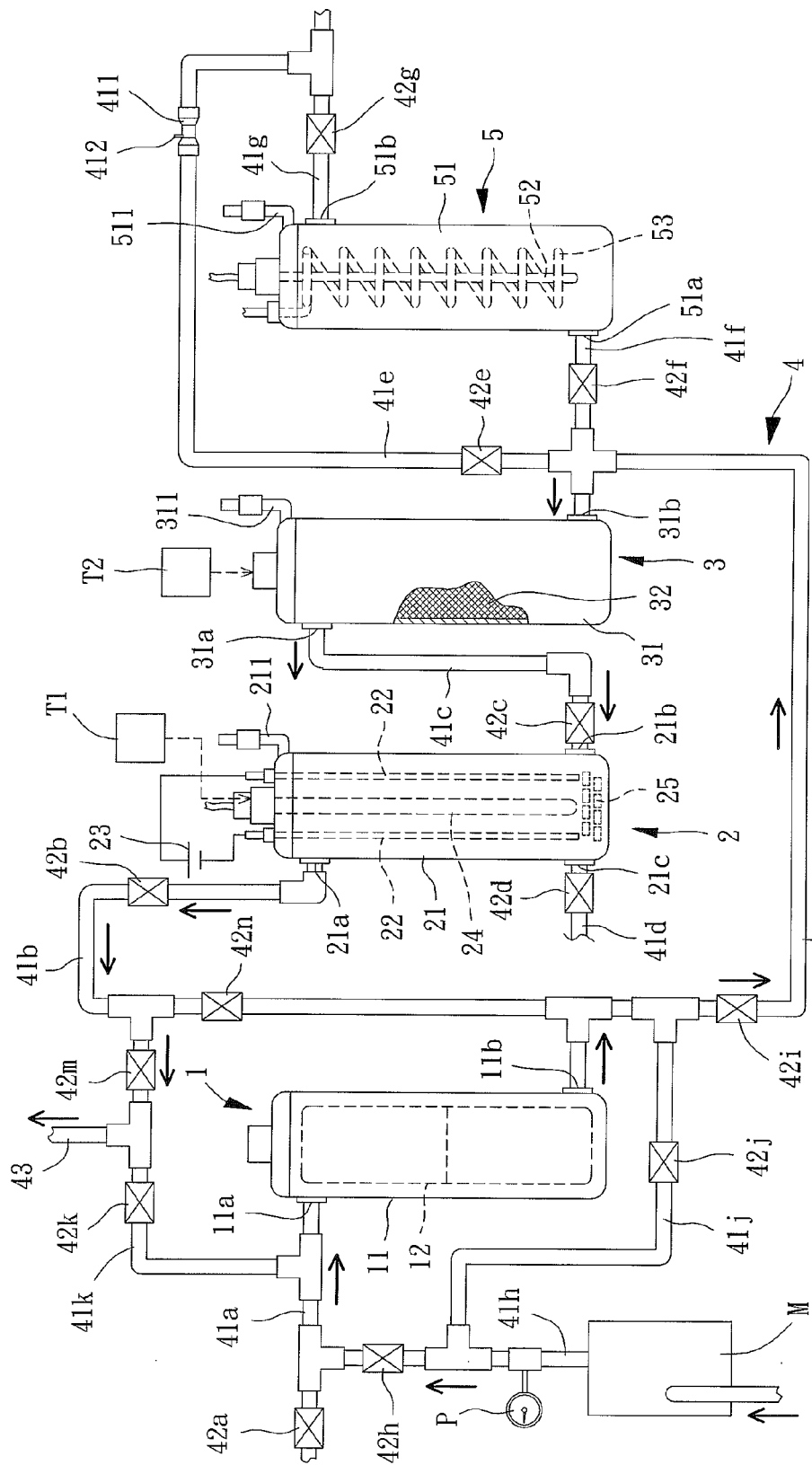
FIG. 5 is a diagrammatic view illustrating a first stage of reverse flushing by the pool water purifying device of the first embodiment according to the present invention.

With reference to FIG. 5, after the previous water purifying procedures by the pool water purifying device, to prevent dirt from remaining in the piping unit 4, a user can control the pool water purifying device to carry out a reverse flushing procedure. Firstly, the valves 42b, 42c, 42h, 42i, and 42m of the piping unit 4 are controlled to be open, the valves 42d, 42e, 42f, 42j, 42k, and 42n are closed, and the valve 42g remains in its original state (open or closed). The water pump M pumps filtered pool water into the pipe 41h. The water flows through the valve 42h into the pipe 41a. Then, the water passes through the first liquid port 11a and flows into the first housing 11 of the rough filtration module 1. Then, the water flows out of the first housing 11 via the second liquid port 11b and flows into the pipe 41i after passing through the pipe 41b. Next, the water flows through the valve 42i and flows into the third housing 31 via the sixth liquid port 31b. After reversely flushing the fine filter 32 in the third housing 31, the water flows out of the third housing 31 via the fifth liquid port 31a. After flowing through the pipe 41c and the valve 42c, the water flows into the second housing 21 via the fourth liquid port 21b and then flows out of the second housing 21 via the third liquid port 21a. Then, the water flows through the pipe 41b, the valve 42b, the pipe 41k, and the valve 42m and flows into the sewage pipe 43 for discharge to a sewage tank (not shown). Thus, the pipes 41h, 41a, 41i, 41c, and 41b can be flushed clean. Furthermore, the fine filter 32 can be flushed clean to prolong its service life.

Figure 6:
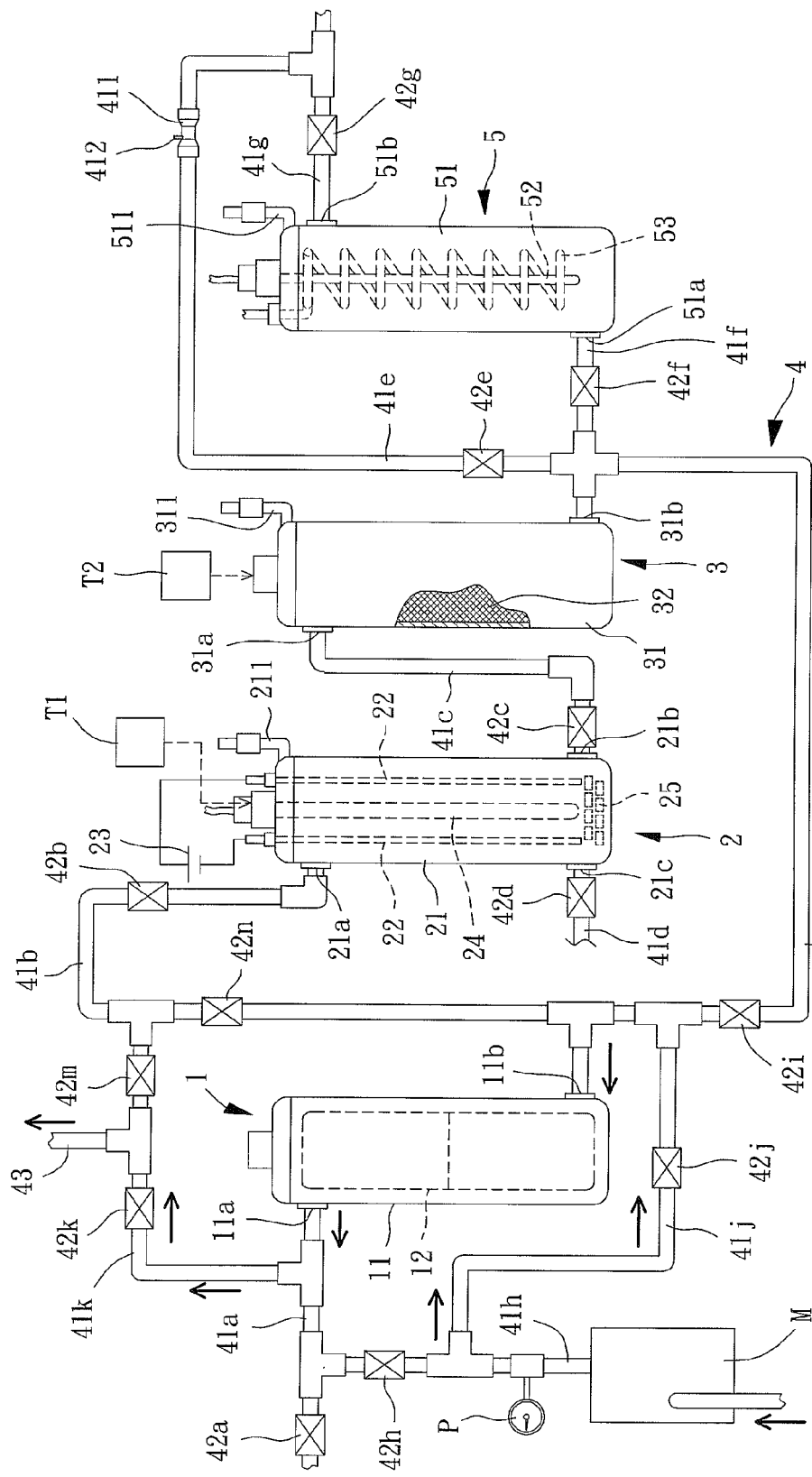
FIG. 6 is a diagrammatic view illustrating a second stage of reverse flushing by the pool water purifying device of the first embodiment according to the present invention.

With reference to FIG. 6, next, the valves 42j and 42k of the piping unit 4 are controlled to be open, the valves 42h, 42i, 42m, and 42n are closed, and the valves 42b, 42c, 42d, 42e, 42f, and 42g remain in their original statuses (open or closed). The water pump M pumps filtered pool water into the pipe 41h. The water flows into the pipe 41j and passes through the valve 42j to the pipe 41b. Then, the water flows through the second liquid port 11b into the first housing 11 of the rough filtration module 1. After reversely flushing the rough filter 12 in the first housing 11, the water flows out of the first housing 11 via the first liquid port 11a and flows into the pipe 41k via the pipe 41a. Then, the water flows into the sewage pipe 43 after passing through the valve 42k and is discharged into the sewage tank. Thus, the pipes 41j and 41k can be flushed clean. Furthermore, the rough filter 12 can be flushed clean to prolong its service life.

Figure 7:
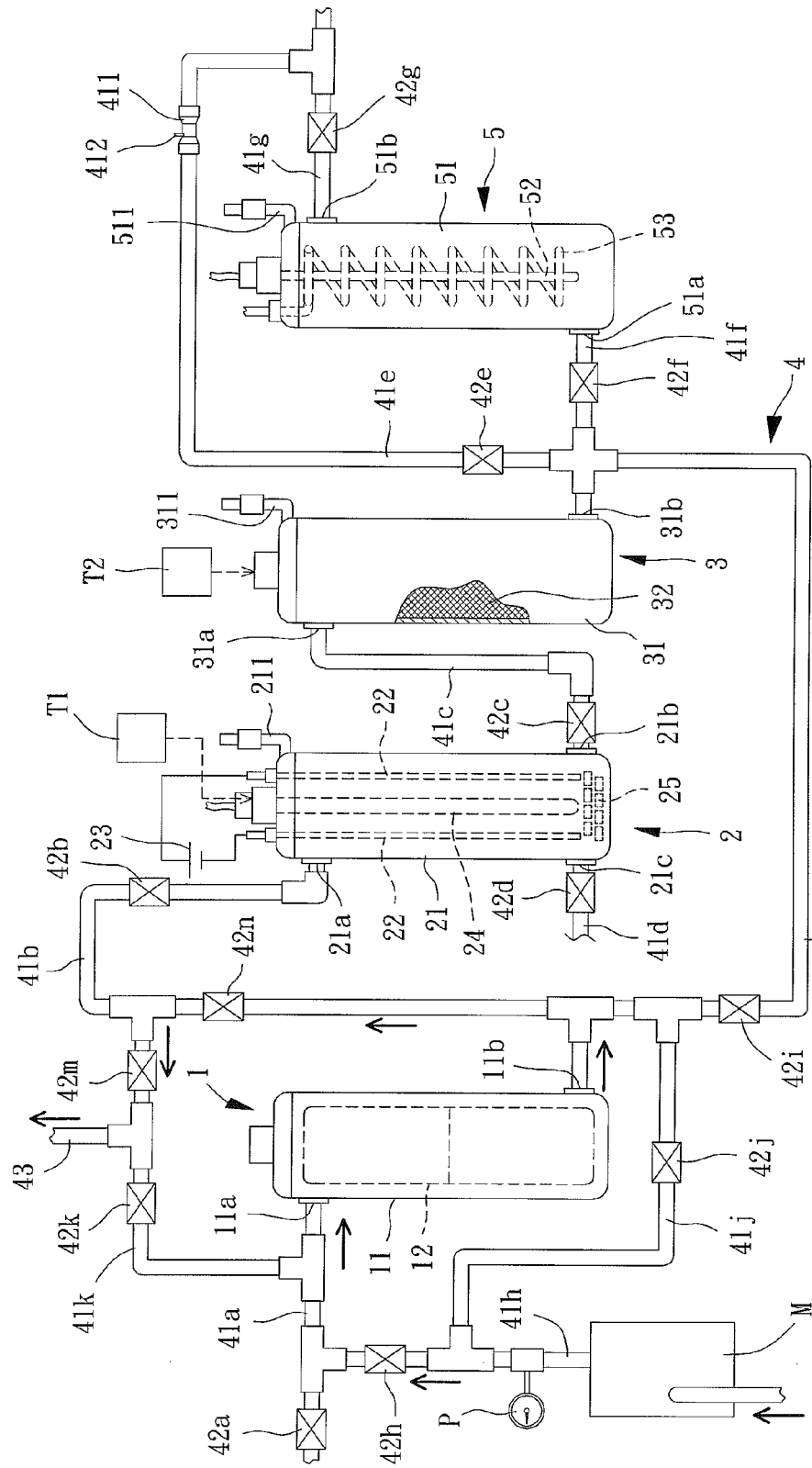
FIG. 7 is a diagrammatic view illustrating a third stage of reverse flushing by the pool water purifying device of the first embodiment according to the present invention.

With reference to FIG. 7, finally, the valves 42h, 42m, and 42n of the piping unit 4 are controlled to be open, the valves 42b, 42i, 42j and 42k are closed, and the valves 42c, 42d, 42e, 42f, and 42g remain in their original states (closed or open). The water pump M pumps filtered pool water into the pipe 41h. The water flows through the valve 42h into the pipe 41a and then passes through the first liquid port 11a into the first housing 11 of the rough filtration module 1. Then, the water flows out of the first housing 11 via the second liquid port 11b and flows through the pipe 41b. After passing through the valve 42n, the water flows into the pipe 41k. Next, the water flows through the valve 42m into the sewage pipe 43 and is discharged into the sewage tank. Thus, the pipes 41h, 41a, and 41b can be flushed clean.

Accordingly, the main features of the present invention are that by removing the impurities in the water with the rough filtration module 1 and then producing hypochlorous acid water with the electrolyzing module 2 or by turning ammonia nitrogen in the water into gaseous nitrogen and then absorbing tiny impurities with the fine filtration module 3, the water purifying operation can continuously be conducted to increase the water purifying efficiency and to achieve effective purification of the pool water while providing the effects of disinfecting the pool water and removing inorganic nitrides from the water with high efficiency. Thus, the quality of the pool water can be assured. Furthermore, the pool water purifying device according to the present invention can proceed with the reverse flushing procedure to maintain the filters and the pipes in a clean state without the risk of blockage. The service lives of the filters and the pipes can be prolonged, and the costs for maintenance and repair can be reduced.

Furthermore, note that the electrolyzing module 2 according to the present invention uses non-diaphragm electrolysis, such that the water passing therethrough is alkalescent, which is suitable for survival of aquatic animals. Furthermore, the present invention can cooperate with a variable electrolytic working voltage that can be adjusted according to the concentration of ammonia nitrogen in the water. As an example, if the present invention is used to purify a pool in which the ammonia nitrogen in the water of the pool is high, the electrolytic working voltage is increased to increase the ammonia nitrogen removal efficiency, rapidly improving the water quality to avoid deaths of aquatic animals.

Figure 8:
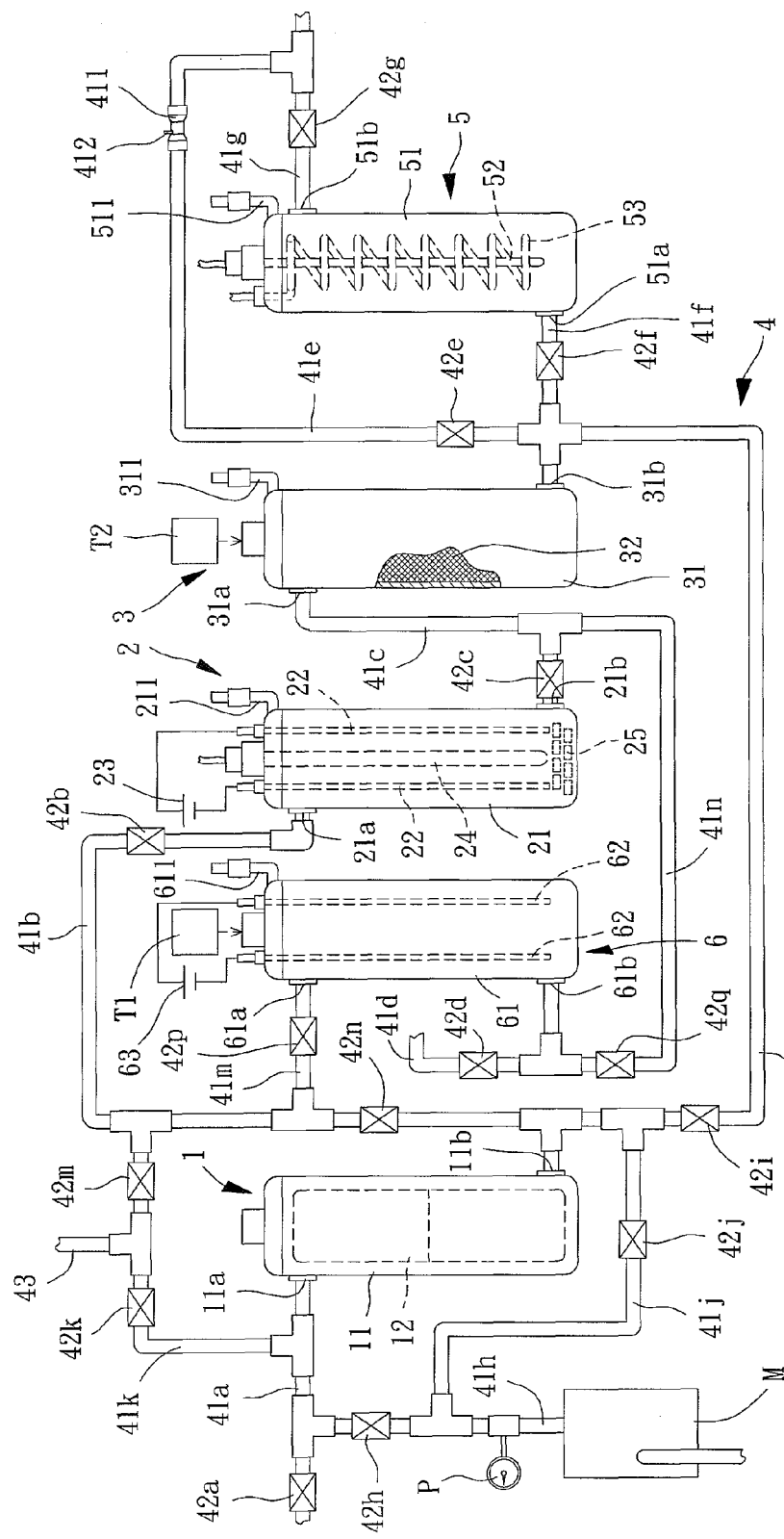
FIG. 8 is a diagrammatic structural plan view of a pool water purifying device of a second embodiment according to the present invention.

FIG. 8 shows a pool water purifying device of a second embodiment according to the present invention. The second embodiment is substantially the same as the first embodiment. The main differences are that the pool water purifying device of the second embodiment according to the present invention further includes a hypochlorous acid water generating module 6 to cooperate with the electrolyzing module 2 for simultaneously generating hypochlorous acid water and removing ammonia nitrogen from the water.

Specifically, the main difference between the hypochlorous acid water generating module 6 and the electrolyzing module 2 is that the hypochlorous acid water generating module 6 does not include the ultraviolet lamp 24. More specifically, the hypochlorous acid water generating module 6 includes a fifth housing 61 having a ninth liquid port 61*a* and a tenth liquid port 61*b*. The ninth liquid port 61*a* is connected to an end of a pipe 41*m* of the piping unit 4. The tenth liquid port 61*b* is connected to an end of a pipe 41*n* of the piping unit 4. Thus, the water can flow into and out of the fifth housing 61 via the pipes 41*m* and 41*n*. The other end of the pipe 41*m* is connected to the pipe 41*b* and is located between the valve 42*n* and a connection of the pipe 41*k* and the pipe 41*b*. Thus, the fifth housing 61 is in communication with the first housing 11. The other end of the pipe 41*n* is connected to the pipe 41*c* and is located between the valve 42*c* and the fifth liquid port 31*a* of the third housing 31, such that the fifth housing 61 is in communication with the second housing 21 and the third housing 31. A valve 42*p* is mounted on the pipe 41*m*, and a valve 42*q* is mounted on the pipe 41*n*. In this embodiment, the pipe 41*d* is connected to the pipe 41*n* rather than connected to the water outlet 21*c* of the second housing 21 in the first embodiment. Furthermore, the second housing 21 in the second embodiment does not include the water outlet 21*c*.

Furthermore, a gas exhaust pipe 611 is mounted on a top of the fifth housing 61. In a case that the pool water to be purified is fresh water, the sodium chloride supply tank T1 intercommunicated with the interior of the second housing 21 in the first embodiment is changed to intercommunicate with an interior of the fifth housing 61 to supply sodium chloride into the water in the fifth housing 61. Similar to the first embodiment, if the pool water to be purified is salt water, the sodium chloride supply tank T1 is not required.

The hypochlorous acid water generating module 6 further includes two electrodes 62 and a power supply 63. The electrodes 62 are mounted to the fifth housing 61 and extend into the fifth housing 61. The power supply 63 is a DC power source. Furthermore, the working voltage of the power supply 23 is preferably variable. A positive pole of the power supply 63 is electrically connected to one of the electrodes 62. A negative pole of the power supply 63 is electrically connected to the other electrode 62.

Figure 9:
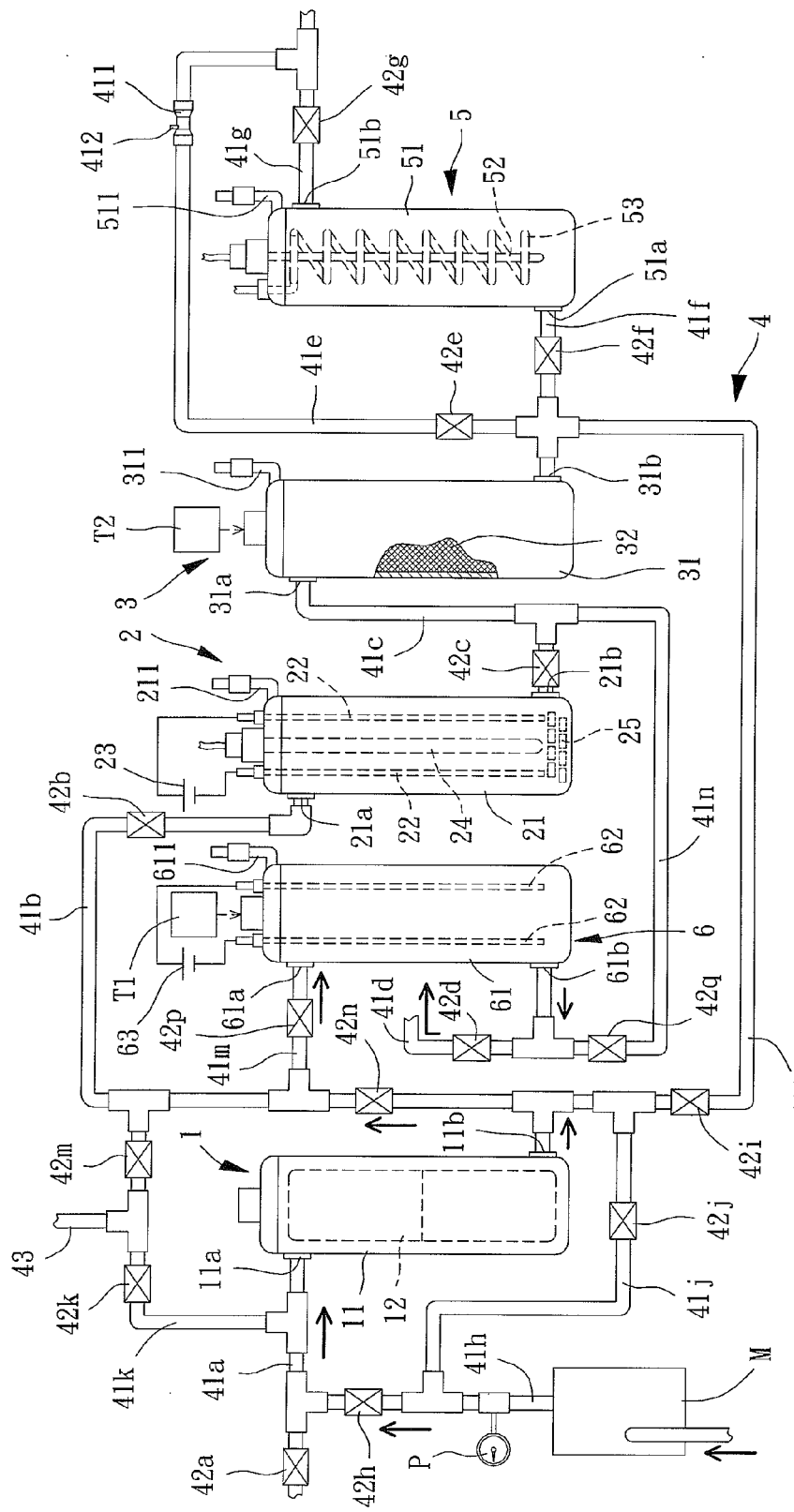
FIG. 9 is a diagrammatic view illustrating generation of hypochlorous acid water by the pool water purifying device of the second embodiment according to the present invention.

With reference to FIG. 9, in use of the pool water purifying device of the second embodiment according to the present invention, the valves 42*d*, 42*h*, 42*n*, and 42*p* of the piping unit 4 are open, the valves 42*b*, 42*i*, 42*j*, 42*k*, 42*m*, and 42*q* are closed, and the valves 42*c*, 42*e*, 42*f*, and 42*g* maintain their original statuses (open or closed). The pool water is pumped by the water pump M into the pipe 41*h* and flows into the pipe 41*a* after passing through the valve 42*h*. Then, the water flows into the first housing 11 of the rough filtration module 1 via the first liquid port 11*a*, and the rough filter 12 conducts preliminary filtration to remove impurities from the water. Then, the water flows out of the first housing 11 via the second liquid port 11*b* and flows into the pipe 41*b*. Next, the water flows through the valve 42*n* into the pipe 41*m*. Next, the water flows through the valve 42*p* and the ninth liquid port 61*a* into the fifth housing 61 of the hypochlorous acid water generating module 6. In a case that the pool water is fresh water, sodium chloride is supplied from the sodium chloride supply tank T1 into the water in the fifth housing 61 (sodium chloride is not supplied if the pool water is salt water). The power supply 63 supplies electricity to the electrodes 62 to electrolyze the sodium chloride-containing water in the fifth housing 61. Gaseous chlorine is generated at one of the electrodes 62 after electrolysis. Gaseous chlorine combines with water to form hypochlorous acid (HClO) water with a disinfectant effect. Hypochlorous acid water flows into the pipe 41*n* via the tenth liquid port 61*b* and flows into the pipe 41*d*. Then, hypochlorous acid water flows through the valve 42*d* and is discharged back into the pool to disinfect the pool water.

Figure 10:
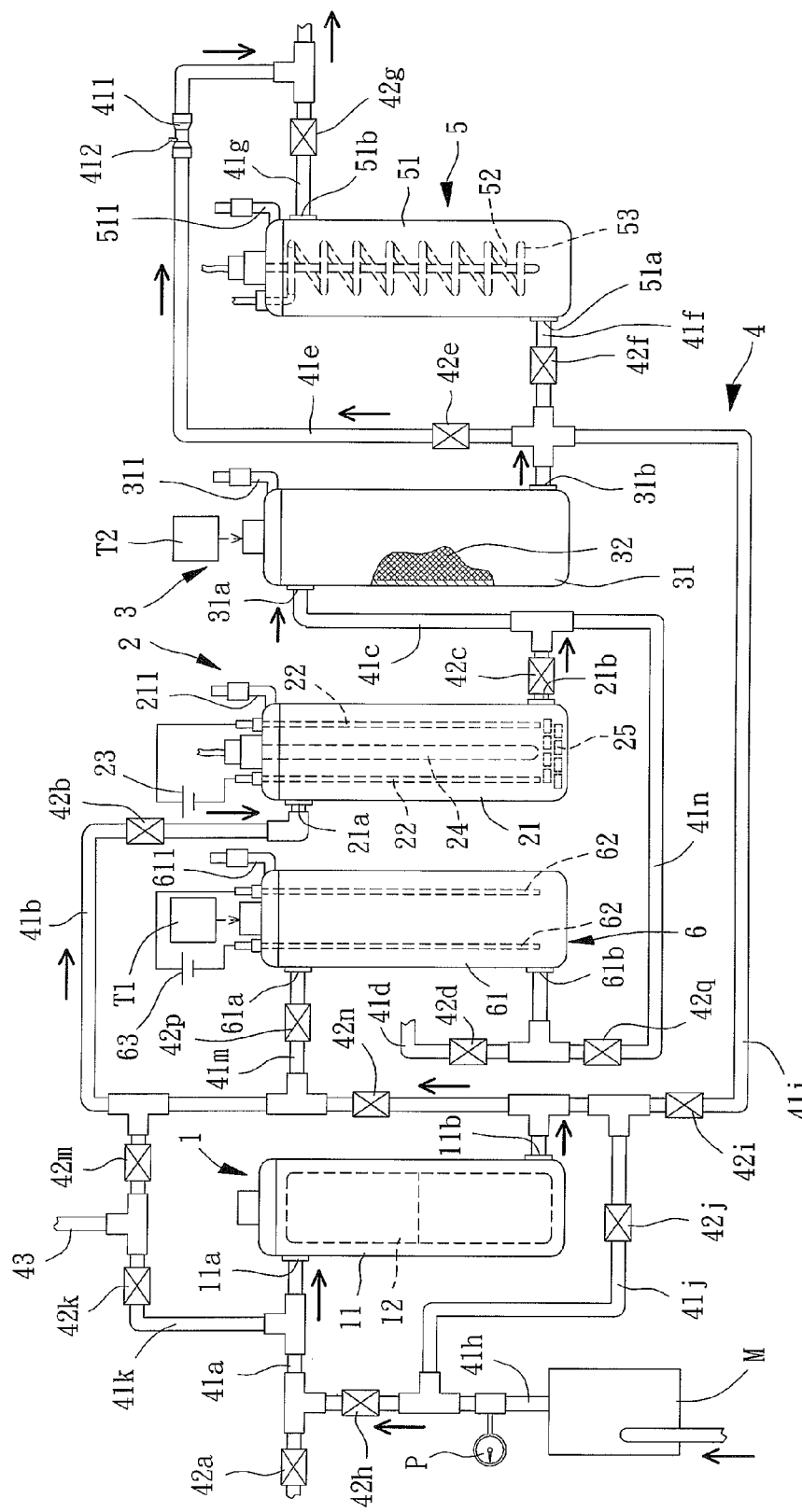
FIG. 10 is a diagrammatic view illustrating removal of ammonia nitrogen and increase of dissolved oxygen by the pool water purifying device of the second embodiment according to the present invention.

If it is not desired to inject hypochlorous acid water into the pool water, with reference to FIG. 10, the valves 42*b*, 42*c*, 42*h*, 42*e*, 42*n*, and 42*p* of the piping unit 4 are opened, the valves 42*d*, 42*f*, 42*g*, 42*i*, 42*j*, 42*k*, 42*m*, and 42*q* are closed, and the ultraviolet lamp 24 is turned on. The pool water flows into the pipe 41*b* after passing through the rough filtration module 1. Most of the water flows through the valves 42*n* and 42*b* and the third liquid port 21*a* into the second housing 21 of the electrolyzing module 2. A small portion of the water flows through the pipe 41*m*, the valve 42*p*, and the ninth liquid port 61*a* into the fifth housing 61 of the hypochlorous acid water generating module 6. Thus, the water having a higher sodium chloride concentration in the fifth housing 61 causes dissolution of sodium chloride in the water in the second housing 21 through a diffusion effect, and the water dissolving sodium chloride in the second housing 21 is electrolyzed by the electrodes 22 to produce hypochlorous acid water. Furthermore, the hypochlorous acid water is radiated by the ultraviolet lamp 24 and decomposes to hydrogen free radicals and chloride free radicals. Chloride free radicals turn ammonia nitrogen into gaseous nitrogen ($N_2$) which is discharged via the gas exhaust pipe 211, achieving the effect of removing ammonia nitrogen from water.

In a case that the pool water is salt water containing sodium chloride, the valve 42*q* is switched to the closed state, such that the water does not have to flow into the fifth housing 61. Instead, the water directly flows into the second hosing 21 to proceed with the procedure for removing ammonia nitrogen.

Similar to the first embodiment, after removal of ammonia nitrogen from the water, the water is guided to flow through the fine filtration module 3 to increase the clarity of the water. Then, the water flows through the venturi tube 411 to increase the dissolved oxygen before it is discharged back into the pool.

Figure 11:
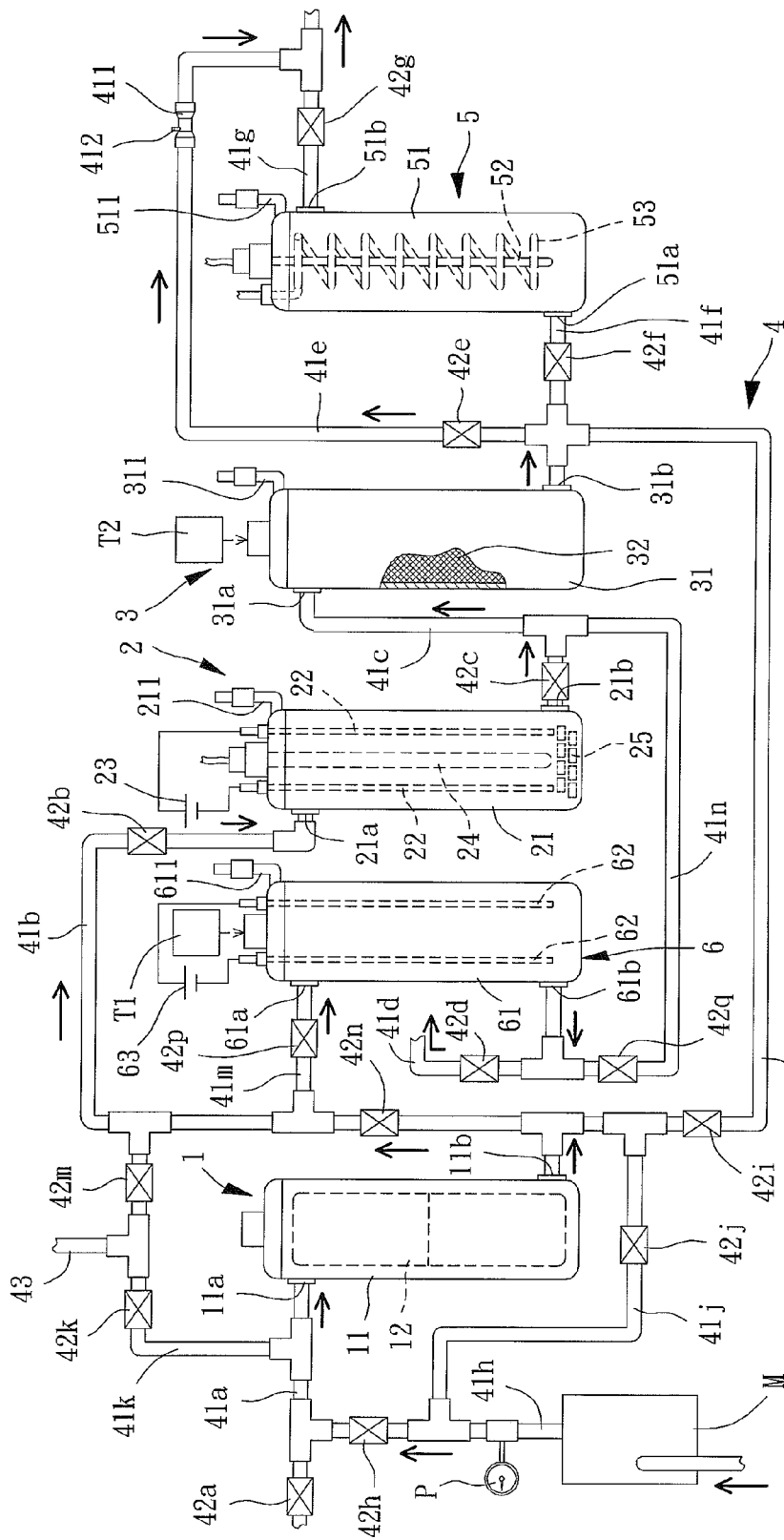
FIG. 11 is a diagrammatic view illustrating generation of hypochlorous acid water, removal of ammonia nitrogen, and increase of dissolved oxygen by the pool water purifying device of the second embodiment according to the present invention.

Furthermore, the second embodiment of the present invention can simultaneously produce hypochlorous acid water and remove ammonia nitrogen from the water. Specifically, with reference to FIG. 11, the valves 42*b*, 42*c*, 42*d*, 42*h*, 42*e*, 42*n*, and 42*p* of the piping unit 4 are opened, the valves 42*f*, 42*g*, 42*i*, 42*j*, 42*k*, 42*m*, and 42*q* are closed, and the ultraviolet lamp 24 is turned on. Thus, the electrodes 62 of the hypochlorous acid water generating module 6 and the electrodes 22 of the electrolyzing module 2 conduct electrolysis at the same time. Thus, a portion of the water passing through the rough filtration module 1 flows into the pipe 41m and passes through the valve 42p and the ninth liquid port 61a into the fifth housing 61, and the electrodes 62 of the hypochlorous acid water generating module 6 conduct electrolysis to produce hypochlorous acid water which is discharged back into the pool via the pipe 41d. Another portion of the water flows through the valves 42n and 42b and the third liquid port 21a into the second housing 21, is electrolyzed by the electrodes 22 of the electrolyzing module 2, is radiated by the ultraviolet lamp 24 to remove ammonia nitrogen, and finally flows back into the pool after passing through the fine filtration module 3 and the venturi tube 411.

Figure 12:
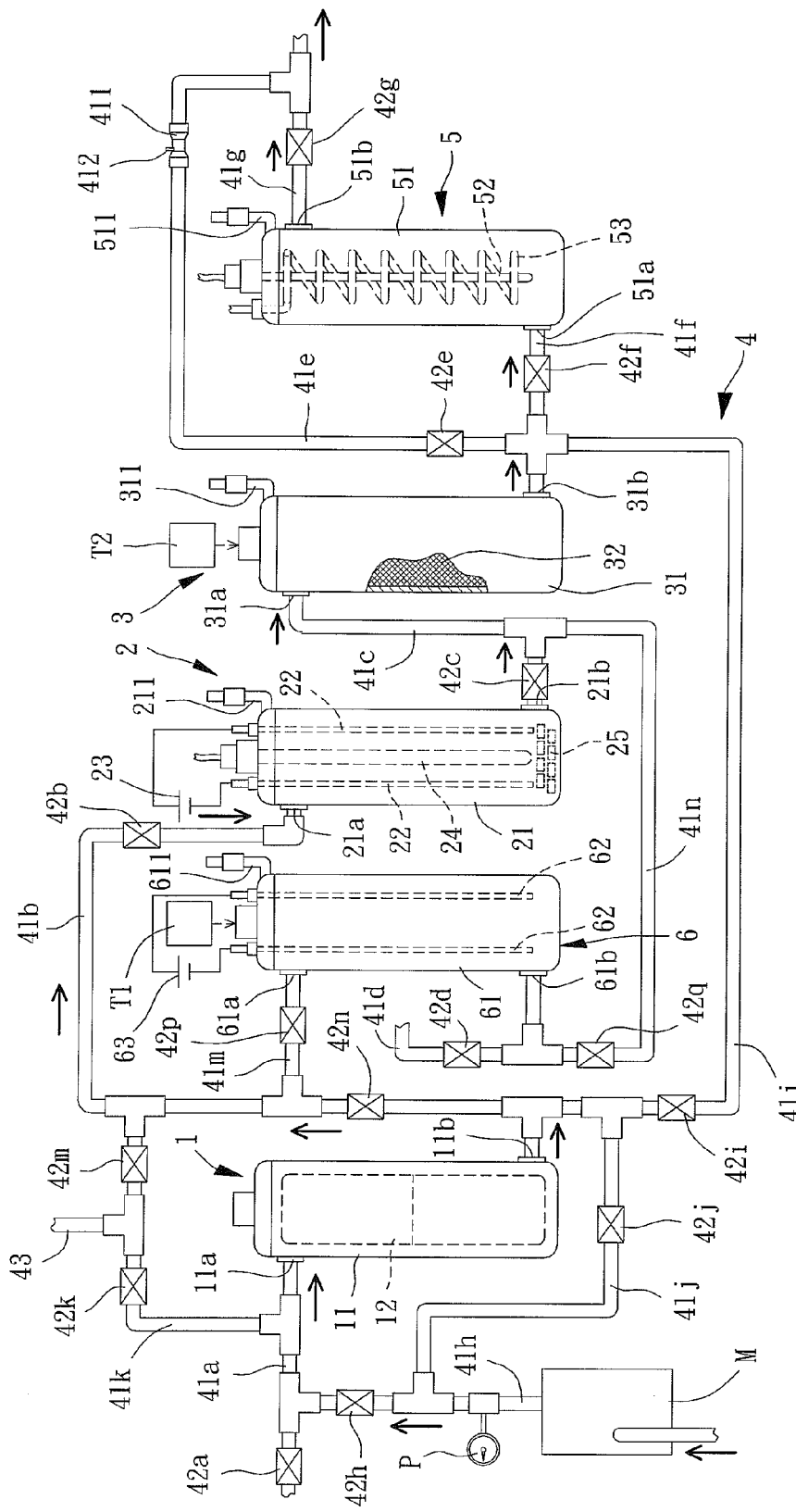
FIG. 12 is a diagrammatic view illustrating removal of ammonia nitrogen and modulation of water temperature by the pool water purifying device of the second embodiment according to the present invention.

With reference to FIG. 12, in an extreme weather event (such as a cold wave), the valves 42b, 42c, 42h, 42f, 42g, 42n, and 42p of the piping unit 4 are open, the valves 42d, 42e, 42i, 42j, 42k, 42m, and 42q are closed, and the heating element 52 of the water temperature modulating module 5 is activated. After the pool water has flowed in sequence through the rough filtration module 1, the electrolyzing module 2, and the fine filtration module 3 filtering the water, the water flows in sequence through the pipes 41e and 41f and passes the valve 42f and the seventh liquid port 51a and then flows into the fourth housing 51 of the water temperature modulating module 5. The filtered water is heated by the heating element 52 to increase the temperature and then flows out of the fourth housing 51 via the eighth liquid port 51b and flows back into the pool via the pipe 41g, achieving a water temperature modulating effect for the pool water. Similarly, in hot weather, the cooling element 53 of the water temperature modulating module 5 can be activated to reduce the water temperature before it is discharged back into the pool. Thus, adverse effect on the yield of the aquatic cultivation due to extreme weather events can be reduced.

Figure 13:
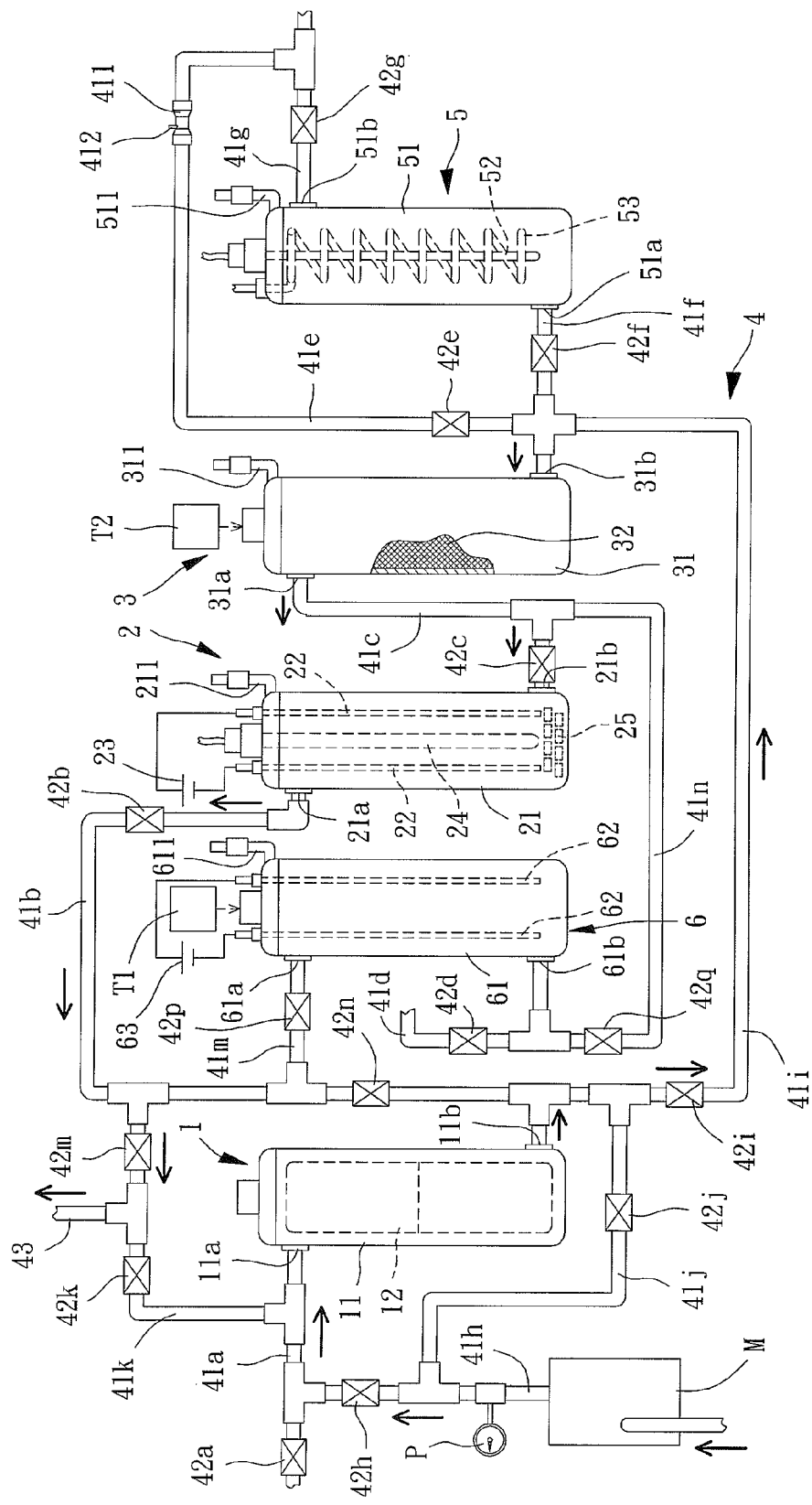
FIGS. 13 and 14 are diagrammatic views illustrating a first stage of reverse flushing by the pool water purifying device of the second embodiment according to the present invention.

With reference to FIG. 13, the pool water purifying device of the second embodiment according to the present invention can also carry out the reverse flushing procedures. Specifically, the valves 42b, 42c, 42h, 42i, and 42m of the piping unit 4 are firstly controlled to be open, the valves 42e, 42f, 42j, 42k, 42n, 42p, and 42q are closed, and the valves 42d and 42g remain in their original states (open or closed). The water pump M pumps filtered pool water into the pipe 41h. The water flows through the valve 42h into the pipe 41a. Then, the water passes through the first liquid port 11a and flows into the first housing 11 of the rough filtration module 1. Then, the water flows out of the first housing 11 via the second liquid port 11b and flows into the pipe 41i after passing through the pipe 41b. Next, the water flows through the valve 42i and flows into the third housing 31 via the sixth liquid port 31b. After reversely flushing the fine filter 32 in the third housing 31, the water flows out of the third housing 31 via the fifth liquid port 31a. After flowing through the pipe 41c and the valve 42c, the water flows into the second housing 21 via the fourth liquid port 21b and then flows out of the second housing 21 via the third liquid port 21a. Then, the water flows through the pipe 41b, the valve 42b, the pipe 41k, and the valve 42m and flows into the sewage pipe 43 for discharge to the sewage tank. Thus, the pipes 41h, 41a, 41i, 41c, and 41b can be flushed clean. Furthermore, the fine filter 32 can be flushed clean to prolong its service life.

Figure 14:
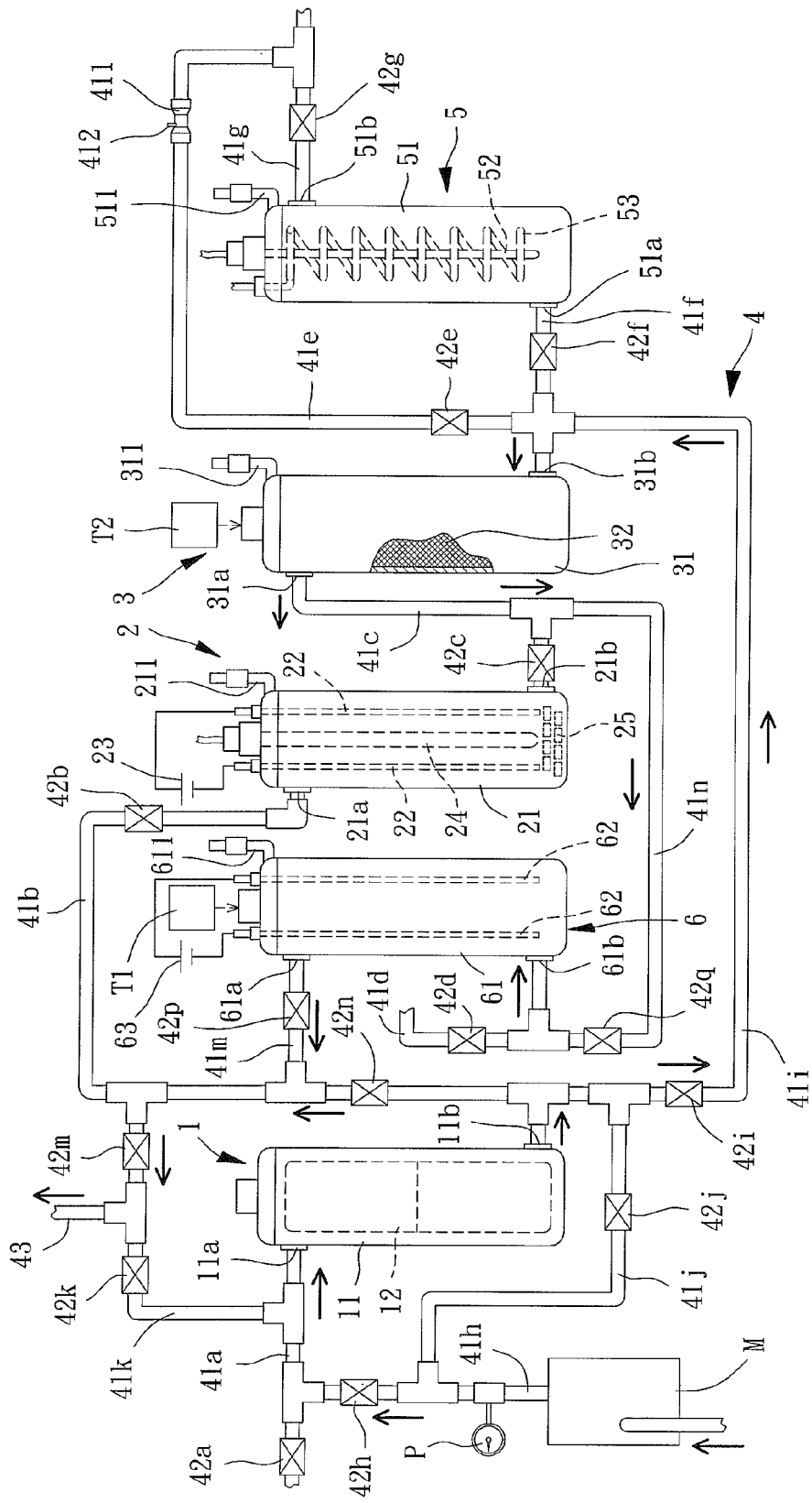

With reference to FIG. 14, the valves 42h, 42i, 42m, 42p, and 42q of the piping unit 4 are then controlled to be open, the valves 42b, 42c, 42d, 42e, 42f, 42j, 42k, and 42n are closed, and the valve 42g remains in its original state (open or closed). The water pump M pumps filtered pool water into the pipe 41h. The water flows through the valve 42h to the pipe 41a. Then, the water flows through the first liquid port 11a into the first housing 11 of the rough filtration module 1. Next, the water flows out of the first housing 11 via the second liquid port 11b and flows through the pipe 41b into the pipe 41i. Then the water flows through the valve 42i and directly flows into the third housing 31 via the sixth liquid port 31b. After reversely flushing the fine filter 32 in the third housing 31, the water flows out of the third housing 31 via the fifth liquid port 31a and flows into the pipe 41n via the pipe 41c. Then, the water passes through the valve 42q and flows into the fifth housing 61 via the tenth liquid port 61b. Then, the water flows out of the fifth housing 61 via the ninth liquid port 61a and flows through the pipe 41m and the valve 42p into the pipe 41b. Next, the water flows into the sewage pipe 43 after passing through the pipe 41k and the valve 42m and is discharged into the sewage tank. Thus, the pipes 41n and 41m can be flushed clean. Furthermore, the pipes 41h, 41a, and 41i and the fine filter 32 can be flushed clean again to further improve the cleanliness. The flushing sequence described with reference to FIGS. 13 and 14 can be reversed.

Figure 15:
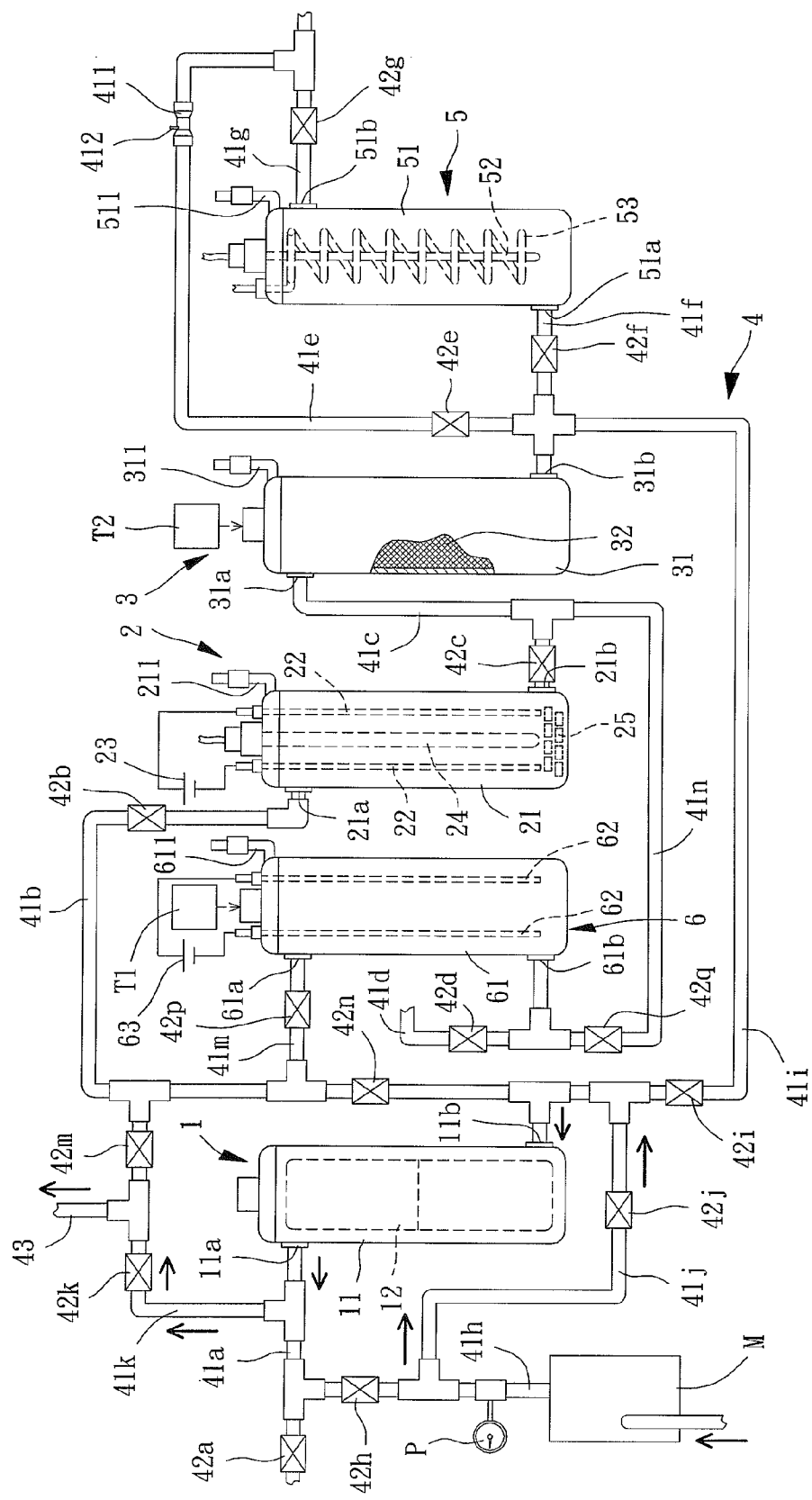
FIG. 15 is a diagrammatic view illustrating a second stage of reverse flushing by the pool water purifying device of the second embodiment according to the present invention.

With reference to FIG. 15, then, the valves 42j and 42k of the piping unit 4 are controlled to be open, the valves 42h, 42i, 42m, and 42n are closed, and the valves 42b, 42c, 42d, 42e, 42f, 42g, 42p, and 42q remain in their original states (open or closed). The water pump M pumps filtered pool water into the pipe 41h. The water flows into the pipe 41j and passes through the valve 42j to the pipe 41b. Then, the water flows through the second liquid port 11b into the first housing 11 of the rough filtration module 1. After reversely flushing the rough filter 12 in the first housing 11, the water flows out of the first housing 11 via the first liquid port 11a and flows into the pipe 41k via the pipe 41a. Then, the water flows into the sewage pipe 43 after passing through the valve 42k and is discharged into the sewage tank. Thus, the pipes 41j and 41k can be flushed clean. Furthermore, the rough filter 12 can be flushed clean to prolong its service life.

Figure 16:
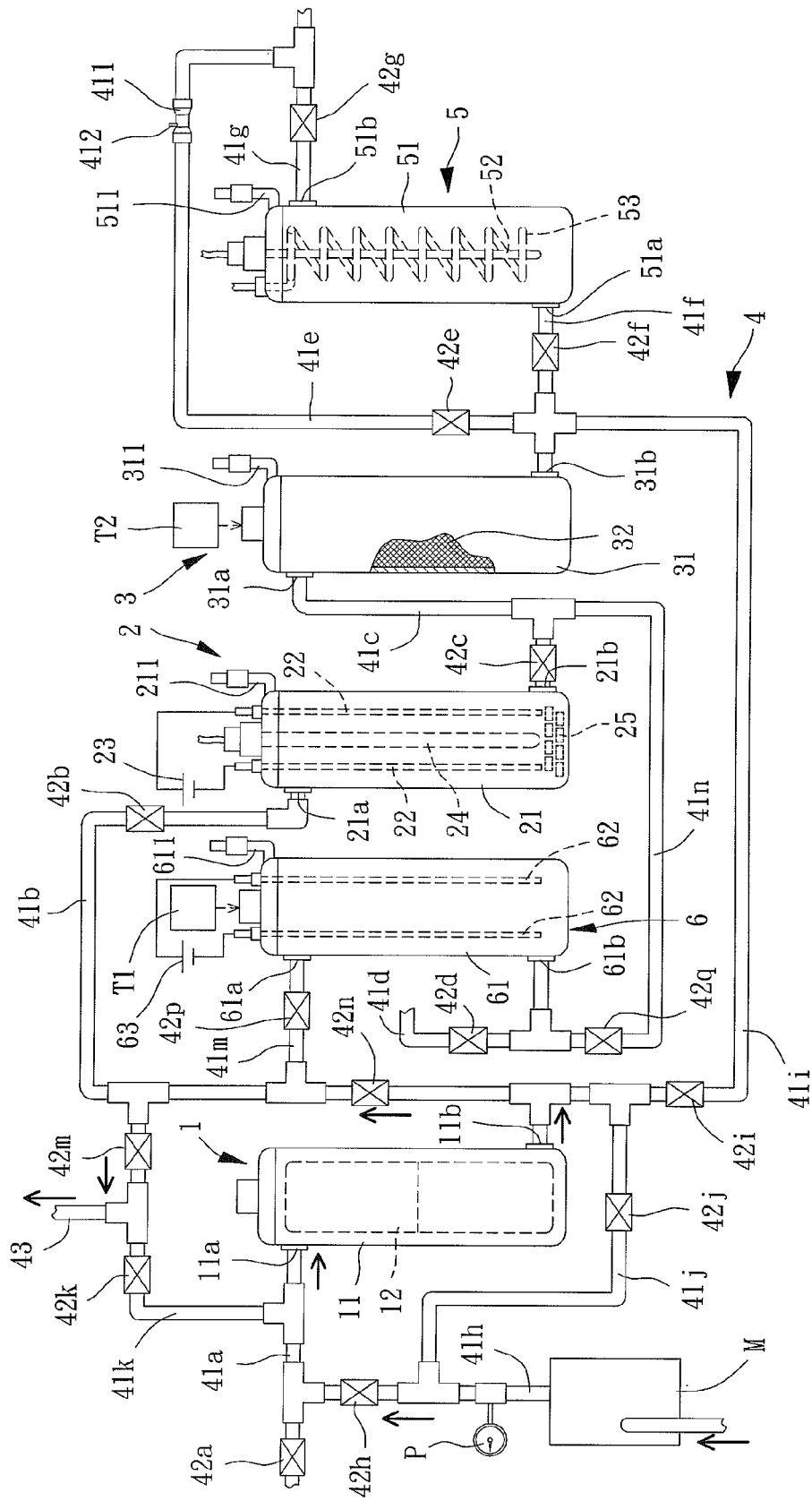
FIG. 16 is a diagrammatic view illustrating a third stage of reverse flushing by the pool water purifying device of the second embodiment according to the present invention.

With reference to FIG. 16, finally, the valves 42h, 42m, and 42n of the piping unit 4 are controlled to be open, the valves 42b, 42i, 42j, 42k, and 42p are closed, and the valves 42c, 42d, 42e, 42f, 42g, and 42q remain in their original states (closed or open). The water pump M pumps filtered pool water into the pipe 41h. The water flows through the valve 42h into the pipe 41a and then passes through the first liquid port 11a into the first housing 11 of the rough filtration module 1. Then, the water flows out of the first housing 11 via the second liquid port 11b and flows through the pipe 41b. After passing through the valve 42n, the water flows into the pipe 41k. Next, the water flows through the valve 42m into the sewage pipe 43 and is discharged into the sewage tank. Thus, the pipes 41h, 41a, and 41b can be flushed clean.

In view of the foregoing, the pool water purifying device according to the present invention can produce hypochlorous acid water with a disinfecting effect or directly turn ammonia nitrogen in the water into gaseous nitrogen to greatly improve the treatment efficiency of inorganic nitrides while providing a disinfecting effect.

The pool water purifying device according to the present invention integrates various modules with different functions required for purifying pool water, allowing continuous water purifying operation to improve the water purifying efficiency while assuring the water quality and reducing the storage space required for the pool water purifying device.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A pool water purifying device comprising:
a rough filtration module including a first housing, with a rough filter received in the first housing, wherein the rough filter contains a layer of silicon carbide particles and a layer of zeolite particles;
an electrolyzing module including a second housing, with two electrodes and an ultraviolet lamp mounted to the second housing and extending into the second housing, with the two electrodes electrically connected to a first power supply;
a fine filtration module including a third housing, with a fine filter received in the third housing, wherein the fine filter contains charcoal or an active carbon cartridge; and
a piping unit including a plurality of pipes and a plurality of valves, with the plurality of valves connecting the first, second, and third housings to intercommunicate the first, second, and third housings with each other, and with the plurality of valves mounted on the plurality of pipes to control communication between the plurality of pipes, wherein the ultraviolet lamp is mounted between the two electrodes, and on/off of the ultraviolet lamp is controllable.

2. The pool water purifying device as claimed in claim 1, wherein a working voltage of the first power supply is variable.

3. The pool water purifying device as claimed in claim 1, further comprising: a gas exhaust pipe mounted to a top of the second housing.

4. The pool water purifying device as claimed in claim 1, further comprising: a water temperature modulating module, with the water temperature modulating module including a fourth housing, a heating element, and a cooling element, with the heating element and the cooling element mounted to the fourth housing and extending into the fourth housing, with one of the heating element and the cooling element being selectively activated to heat or cool water in the fourth housing, with the piping unit further including a first pipe and a first valve on the first pipe, with the fourth housing intercommunicated with the third housing via the first pipe, and with the first valve controlling communication between the third housing and the fourth housing.

5. The pool water purifying device as claimed in claim 1, with the rough filter including an upper layer and a lower layer connected to the upper layer, with the upper layer including a plurality of silicon carbide particles being the layer of silicon carbide particles, with the lower layer including a plurality of zeolite particles being the layer of zeolite particles, with the first housing including two liquid ports, with one of the two liquid ports of the first housing aligned with the upper layer of the rough filter, and with another of the two liquid ports of the first housing aligned with the lower layer of the rough filter.

6. The pool water purifying device as claimed in claim 1, further comprising: a hypochlorous acid water generating module, with the hypochlorous acid water generating module including a fifth housing and two electrodes, with the two electrodes of the hypochlorous acid water generating module mounted to the fifth housing and extending into the fifth housing, with the two electrodes of the hypochlorous acid water generating module electrically connected to a second power supply, with the piping unit further including additional pipes and additional valves on the additional pipes, with the fifth housing intercommunicated with the first, second, and third housings by the additional pipes, and with the additional valves controlling communication between the plurality of pipes and the additional pipes.

7. The pool water purifying device as claimed in claim 6, further comprising: a sodium chloride supply tank in communication with an interior of the fifth housing.

8. The pool water purifying device as claimed in claim 1, further comprising: a sodium chloride supply tank in communication with an interior of the second housing.

9. A pool water purifying device comprising:
a rough filtration module including a first housing, with a rough filter received in the first housing, wherein the rough filter contains a layer of silicon carbide particles and a layer of zeolite particles;
an electrolyzing module including a second housing, with two electrodes and an ultraviolet lamp mounted to the second housing and extending into the second housing, with the two electrodes electrically connected to a first power supply;
a fine filtration module including a third housing, with a fine filter received in the third housing, wherein the fine filter contains charcoal or an active carbon cartridge; and
a piping unit including a plurality of pipes and a plurality of valves, with the plurality of valves connecting the first, second, and third housings to intercommunicate the first, second, and third housings with each other, and with the plurality of valves mounted on the plurality of pipes to control communication between the plurality of pipes; and
a plurality of ceramics received in a bottom portion of the second housing, with the second housing including two liquid ports, and with the plurality of ceramics aligned with one of the two liquid ports.

10. The pool water purifying device as claimed in claim 9, further comprising: a gas exhaust pipe mounted to a top of the second housing.

11. The pool water purifying device as claimed in claim 9, further comprising: a water temperature modulating module, with the water temperature modulating module including a fourth housing, a heating element, and a cooling element, with the heating element and the cooling element mounted to the fourth housing and extending into the fourth housing, with one of the heating element and the cooling element being selectively activated to heat or cool water in the fourth housing, with the piping unit further including a first pipe and a first valve on the first pipe, with the fourth housing intercommunicated with the third housing via the first pipe, and with the first valve controlling communication between the third housing and the fourth housing.

12. The pool water purifying device as claimed in claim 9, with the rough filter including an upper layer and a lower layer connected to the upper layer, with the upper layer including a plurality of silicon carbide particles being the layer of silicon carbide particles, with the lower layer including a plurality of zeolite particles being the layer of zeolite particles, with the first housing including two liquid ports, with one of the two liquid ports of the first housing aligned with the upper layer of the rough filter, and with another of the two liquid ports of the first housing aligned with the lower layer of the rough filter.

13. The pool water purifying device as claimed in claim 9, further comprising: a hypochlorous acid water generating module, with the hypochlorous acid water generating module including a fifth housing and two electrodes, with the two electrodes of the hypochlorous acid water generating module mounted to the fifth housing and extending into the fifth housing, with the two electrodes of the hypochlorous acid water generating module electrically connected to a second power supply, with the piping unit further including additional pipes and additional valves on the additional pipes, with the fifth housing intercommunicated with the first, second, and third housings by the additional pipes, and with the additional valves controlling communication between the plurality of pipes and the additional pipes.

14. The pool water purifying device as claimed in claim 9, further comprising: a sodium chloride supply tank in communication with an interior of the second housing.

15. A pool water purifying device comprising:
a rough filtration module including a first housing, with a rough filter received in the first housing, wherein the rough filter contains a layer of silicon carbide particles and a layer of zeolite particles;
an electrolyzing module including a second housing, with two electrodes and an ultraviolet lamp mounted to the second housing and extending into the second housing, with the two electrodes electrically connected to a first power supply;
a fine filtration module including a third housing, with a fine filter received in the third housing, wherein the fine filter contains charcoal or an active carbon cartridge; and
a piping unit including a plurality of pipes and a plurality of valves, with the plurality of valves connecting the first, second, and third housings to intercommunicate the first, second, and third housings with each other, and with the plurality of valves mounted on the plurality of pipes to control communication between the plurality of pipes,
with the third housing including two liquid ports, with one of the plurality of pipes of the piping unit connected to one of the two liquid ports of the third housing, with a venturi tube mounted on the one of the plurality of pipes and having a throat, with a ventilation pipe including an end intercommunicated with the throat of the venturi tube, and with the ventilation pipe further including another end, with the other end of the ventilation pipe being open.

16. The pool water purifying device as claimed in claim 15, further comprising: a gas exhaust pipe mounted to a top of the second housing.

17. The pool water purifying device as claimed in claim 15, further comprising: a water temperature modulating module, with the water temperature modulating module including a fourth housing, a heating element, and a cooling element, with the heating element and the cooling element mounted to the fourth housing and extending into the fourth housing, with one of the heating element and the cooling element being selectively activated to heat or cool water in the fourth housing, with the piping unit further including a first pipe and a first valve on the first pipe, with the fourth housing intercommunicated with the third housing via the first pipe, and with the first valve controlling communication between the third housing and the fourth housing.

18. The pool water purifying device as claimed in claim 15, with the rough filter including an upper layer and a lower layer connected to the upper layer, with the upper layer including a plurality of silicon carbide particles being the layer of silicon carbide particles, with the lower layer including a plurality of zeolite particles being the layer of zeolite particles, with the first housing including two liquid ports, with one of the two liquid ports of the first housing aligned with the upper layer of the rough filter, and with another of the two liquid ports of the first housing aligned with the lower layer of the rough filter.

19. The pool water purifying device as claimed in claim 15, further comprising: a hypochlorous acid water generating module, with the hypochlorous acid water generating module including a fifth housing and two electrodes, with the two electrodes of the hypochlorous acid water generating module mounted to the fifth housing and extending into the fifth housing, with the two electrodes of the hypochlorous acid water generating module electrically connected to a second power supply, with the piping unit further including additional pipes and additional valves on the additional pipes, with the fifth housing intercommunicated with the first, second, and third housings by the additional pipes, and with the additional valves controlling communication between the plurality of pipes and the additional pipes.

20. The pool water purifying device as claimed in claim 15, further comprising: a sodium chloride supply tank in communication with an interior of the second housing.

* * * * *